United States Patent
Nakamura et al.

(10) Patent No.: US 10,435,113 B1
(45) Date of Patent: Oct. 8, 2019

(54) BICYCLE OPERATING DEVICE

(71) Applicant: Shimano Inc., Sakai, Osaka (JP)

(72) Inventors: Tsuyoshi Nakamura, Osaka (JP); Yoshimitsu Miki, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/944,011

(22) Filed: Apr. 3, 2018

(51) Int. Cl.
*B62M 25/04* (2006.01)
*B62K 23/06* (2006.01)

(52) U.S. Cl.
CPC ............ *B62M 25/04* (2013.01); *B62K 23/06* (2013.01)

(58) Field of Classification Search
CPC ........ B62K 23/06; B62K 23/02; B62M 25/04; B62M 25/02; B60T 7/102; B62L 3/02; F16C 1/18; F16C 1/12; F16C 1/101; G05G 1/04; Y10T 74/20402; Y10T 74/2042; Y10T 74/20426; Y10T 74/20438
See application file for complete search history.

(56) References Cited

U.S. PATENT DOCUMENTS

| | | | | |
|---|---|---|---|---|
| 5,617,761 | A * | 4/1997 | Kawakami | B62K 23/06 74/142 |
| 5,809,923 | A * | 9/1998 | Yilmaz | B63B 1/14 114/362 |
| 7,526,979 | B2 | 5/2009 | Tsumiyama | |
| 7,628,095 | B2 | 12/2009 | Funai | |
| 8,640,568 | B2 | 2/2014 | Takeuchi et al. | |
| 2007/0193389 | A1 * | 8/2007 | Kawakami | B62K 23/06 74/502.2 |
| 2011/0056319 | A1 * | 3/2011 | Takeuchi | B62K 23/06 74/473.14 |
| 2012/0297918 | A1 | 11/2012 | Miki et al. | |
| 2015/0210342 | A1 | 7/2015 | Fukao et al. | |

* cited by examiner

*Primary Examiner* — Daniel D Yabut
(74) *Attorney, Agent, or Firm* — Global IP Counselors, LLP

(57) ABSTRACT

A bicycle operating device includes a base member, a positioning ratchet, a holding member and a restricting member. The holding member moves between a holding position and a releasing position to selectively establish a plurality of gear positions. The holding member prevents movement of the positioning ratchet while the holding member is in the holding position, and releases the positioning ratchet for movement while the holding member is in the releasing position. The restricting member moves between a non-restricting position and at least one restricting position in which the restricting member restricts movement of the positioning ratchet. The positioning ratchet moves in a first set of the gear positions while the restricting member is in the non-restricting position. The positioning ratchet moves in a second set of the gear positions while the restricting member is in the at least one restricting position.

22 Claims, 21 Drawing Sheets

BICYCLE OPERATING DEVICE

BACKGROUND

Field of the Invention

This invention generally relates to a bicycle operating device. More specifically, the present invention relates to a bicycle operating device that allows the rider (user) to selectively regulate the bicycle operating device between at least two different sets of operating positions for operating different bicycle components.

Background Information

Bicycles are often provided with one or more bicycle components that can be operated and/or adjusted by a rider while riding. Examples of some these bicycle components include a gear changing device (e.g., a derailleur or an internally geared hub). A bicycle operating device is usually provided on a bicycle in a convenient place (e.g., on a bicycle handlebar) for a rider to operate and/or adjust these bicycle components. The bicycle operating device is often connected to the bicycle component with, for example, a Bowden-type control cable. In the case of shifting a gear changing device, the bicycle operating device is typically designed for a specific number of gear shift operations. This is especially the case for mechanical (e.g., cable operated) bicycle operating devices that have an indexing arrangement for positively engaging a selected gear. However, typically, with a bicycle operating device that has an indexing arrangement, the bicycle operating device can only be used with drive trains with a particular number of gear positions. In other words, indexing types of bicycle operating devices are typically made for shifting between a particular number of gear positions. Thus, if, for example, the rider changes from a drive train with fewer or more gear positions, then the rider will need to change the bicycle operating device to match the new drive train.

SUMMARY

Generally, the present disclosure is directed to various features of a bicycle operating device that allows the rider (user) to selectively regulate the bicycle operating device between at least two different sets of operating positions for operating different bicycle components. More specifically, in the case of shifting a gear changing device, the bicycle operating device is configured to operate two different drive trains that have different number of gear positions.

In view of the state of the known technology and in accordance with a first aspect of the present disclosure, a bicycle operating device is basically provided that comprises a base member, a positioning ratchet, a holding member and a restricting member. The positioning ratchet is movably mounted with respect to the base member. The positioning ratchet is configured to move a first direction and a second direction that is opposite to the first direction. The holding member is movably mounted with respect to the base member between a holding position and a releasing position to selectively establish a plurality of gear positions of the positioning ratchet. The holding member prevents movement of the positioning ratchet in the second direction while the holding member is in the holding position. The holding member releases the positioning ratchet for movement in the second direction while the holding member is in the releasing position. The holding member holds the positioning ratchet in one of the gear positions while the holding member is in the holding position. The restricting member is movably mounted with respect to the base member between a non-restricting position and at least one restricting position. The restricting member is configured to restrict movement of the positioning ratchet in the first direction while the restricting member is in the restricting position. The positioning ratchet is arranged to move in a first set of the gear positions while the restricting member is positioned in the non-restricting position. The positioning ratchet is arranged to move in a second set of the gear positions while the restricting member is positioned in the at least one restricting position.

Advantageously according to the first aspect of the present invention, the bicycle operating device can be used to operate two different drive trains that have different number of gear positions.

In accordance with a second aspect of the present invention, a bicycle operating device is basically provided that comprises a base member, a positioning ratchet, a holding member and a restricting member. The positioning ratchet is movably mounted with respect to the base member. The positioning ratchet is configured to move a first direction and a second direction that is opposite to the first direction. The holding member is movably mounted with respect to the base member between a holding position and a releasing position to selectively establish a plurality of gear positions. The holding member prevents movement of the positioning ratchet in the second direction while the holding member is in the holding position. The holding member releases the positioning ratchet for movement in the second direction while the holding member is in the releasing position. The holding member holds the positioning ratchet in one of the gear positions while the holding member is in the holding position. The gear positions including a first gear position and a second gear position. The second gear position is sequentially arranged adjacent and downstream of the first gear position as the positioning ratchet moves in the first direction from the first gear position to the second gear position. The restricting member is movably mounted with respect to the base member between a non-restricting position and at least one restricting position. The positioning ratchet is arranged to move in a first set of the gear positions including the first gear position while the restricting member is positioned in the non-restricting position. The positioning ratchet is arranged to move in a second set of the gear positions not including the first gear position while the restricting member is positioned in the at least one restricting position.

Advantageously according to the second aspect of the present invention, the bicycle operating device can be used to operate two different drive trains that have different number of gear positions.

In accordance with a third aspect of the present invention, a bicycle operating device is basically provided that comprises a base member, a positioning ratchet, a holding member and a restricting member. The positioning ratchet is movably mounted with respect to the base member. The positioning ratchet is configured to move a first direction and a second direction that is opposite to the first direction. The holding member is movably mounted with respect to the base member between a holding position and a releasing position to selectively establish a plurality of gear positions. The holding member prevents movement of the positioning ratchet in the second direction while the holding member is in the holding position. The holding member releases the positioning ratchet for movement in the second direction while the holding member is in the releasing position. The holding member holds the positioning ratchet in one of the gear positions while the holding member is in the holding position. The restricting member is movably mounted with respect to the base member between a non-restricting position and at least two restricting positions to establish at least three different sets of the gear positions. The positioning ratchet is arranged to move in a first set of the at least three different sets of the gear positions while the restricting member is positioned in the non-restricting position. The positioning ratchet is arranged to move in at least two additional sets of the at least three different sets of the gear positions while the restricting member is positioned in the at least two restricting positions, respectively.

Advantageously according to the third aspect of the present invention, the bicycle operating device can be used to operate two different drive trains that have different number of gear positions.

In accordance with a fourth aspect of the present invention, a bicycle operating device is basically provided that comprises a base member, a positioning ratchet, a holding member and a restricting member. The positioning ratchet is movably mounted with respect to the base member about a pivot axis. The positioning ratchet is configured to move a first direction and a second direction that is opposite to the first direction. The holding member is movably mounted with respect to the base member between a holding position and a releasing position to selectively establish at least four gear positions. The holding member prevents movement of the positioning ratchet in the second direction while the holding member is in the holding position. The holding member releases the positioning ratchet for movement in the second direction while the holding member is in the releasing position. The holding member holds the positioning ratchet in one of the gear positions while the holding member is in the holding position. The restricting member is movably mounted with respect to the base member between a non-restricting position and at least one restricting position. The positioning ratchet is arranged to move in a first set of the gear positions while the restricting member is positioned in the non-restricting position. The positioning ratchet is arranged to move in a second set of the gear positions while the restricting member is positioned in the at least one restricting position.

Advantageously according to the fourth aspect of the present invention, the bicycle operating device can be used to operate two different drive trains that have different number of gear positions.

In accordance with a fifth aspect of the present invention, the bicycle operating device according to any one of the first to fourth aspects is configured so that the holding member selectively establishes at least four gear positions.

Advantageously according to the fifth aspect of the present invention, the bicycle operating device can be utilized with drive trains having at least four gear positions.

In accordance with a sixth aspect of the present invention, the bicycle operating device according to any one of the first to fifth aspects is configured so that the second set of the gear positions has a fewer total number of the gear positions than a total number of the gear positions of the first set of the gear positions.

Advantageously according to the sixth aspect of the present invention, the bicycle operating device can be used to operate two different drive trains that have different number of gear positions.

In accordance with a seventh aspect of the present invention, the bicycle operating device according to any one of the first to sixth aspects is configured so that the gear positions include a first gear position and a second gear position, the second gear position is sequentially arranged adjacent and downstream of the first gear position as the positioning ratchet moves in the first direction from the first gear position to the second gear position, the first set of the gear positions includes the second gear position, and the second set of the gear positions not includes the second gear position.

Advantageously according to the seventh aspect of the present invention, the bicycle operating device can effectively limit the number of gear positions that can be accessed by moving the positioning ratchet in the second direction while the restricting member is in the restricting position.

In accordance with an eighth aspect of the present invention, the bicycle operating device according to any one of the first to seventh aspects is configured so that the at least one restricting position includes a first restricting position and a second restricting position to establish at least three different sets of the gear positions, the positioning ratchet being arranged to move in the second set of the gear positions while the restricting member is in the first restricting position, and to move in a third set of the gear positions while the restricting member is in the second restricting position.

Advantageously according to the eighth aspect of the present invention, the bicycle operating device can be easily used to operate three different bicycle drive trains having different speed ranges.

In accordance with a ninth aspect of the present invention, the bicycle operating device according to the eighth aspect is configured so that the second set of the gear positions has a fewer total number of the gear positions than a total number of the gear positions of the first set of the gear positions, and the third set of the gear positions has a fewer total number of the gear positions than the total number of the gear positions of the second set of the gear positions.

Advantageously according to the ninth aspect of the present invention, the bicycle operating device can be easily used to operate three different bicycle drive trains having different speed ranges.

In accordance with a tenth aspect of the present invention, the bicycle operating device according to any one of the first to ninth aspects is configured so that the restricting member is pivotally mounted with respect to the base member about a mounting axis.

Advantageously according to the tenth aspect of the present invention, a user or rider can easily operate the restricting member of the bicycle operating device to effectively limit the number of gear positions that can be accessed while the restricting member is in the restricting position.

In accordance with an eleventh aspect of the present invention, the bicycle operating device according to the tenth aspect is configured so that the restricting member includes a non-restriction surface that does not restrict engagement of the holding member with the positioning ratchet to establish each of the gear positions, and the restricting member includes a restriction surface that restricts movement of the positioning ratchet in the first direction while the restricting member is positioned in the at least one restricting position.

Advantageously according to the eleventh aspect of the present invention, the bicycle operating device can permit the positioning ratchet to move to establish each of the gear positions.

In accordance with a twelfth aspect of the present invention, the bicycle operating device according to the tenth or eleventh aspect is configured so that the at least one restricting position includes a first restricting position and a second restricting position to establish at least three different sets of the gear positions. The restricting member includes a first restriction surface that restricts movement of the positioning ratchet in the first direction while the restricting member is positioned in the first restricting position. The restricting member includes a second restriction surface that restricts movement of the positioning ratchet in the first direction while the restricting member is positioned in the second restricting position.

Advantageously according to the twelfth aspect of the present invention, the bicycle operating device can be easily used to operate three different bicycle drive trains having different speed ranges.

In accordance with a thirteenth aspect of the present invention, the bicycle operating device according to the twelfth aspect is configured so that the first restriction surface is located a first linear distance from the mounting axis of the restricting member, and the second restriction surface is located a second linear distance from the mounting axis of the restricting member, the second linear distance is longer than the first linear distance.

Advantageously according to the thirteenth aspect of the present invention, the bicycle operating device can effectively establish the first and second restricting positions to provide three different sets of the gear positions.

In accordance with a fourteenth aspect of the present invention, the bicycle operating device according to any one of the first to thirteenth aspects is configured so that the restricting member is configured to contact a part fixed to the positioning ratchet so that the restricting member restricts movement of the positioning ratchet in the first direction while the restricting member is in the restricting position.

Advantageously according to the fourteenth aspect of the present invention, the bicycle operating device can effectively limit the number of gear positions that can be accessed while the restricting member is in the restricting position.

In accordance with a fifteenth aspect of the present invention, the bicycle operating device according to any one of the first to fourteenth aspects is configured so that the positioning ratchet is rotatably mounted with respect to the base member about a pivot axis.

Advantageously according to the fifteenth aspect of the present invention, the bicycle operating device can effectively establish the gear positions.

In accordance with a sixteenth aspect of the present invention, the bicycle operating device according to the fifteenth aspect is configured so that the positioning ratchet includes a plurality of positioning abutments circumferentially arranged with respect to the pivot axis, the positioning abutments are selectively engaged with the holding member to selectively establish the gear positions.

Advantageously according to the sixteenth aspect of the present invention, the bicycle operating device can effectively establish the gear positions.

In accordance with a seventeenth aspect of the present invention, the bicycle operating device according to the fifteenth or sixteenth aspect further comprises a wire takeup member arranged to rotate together with the positioning ratchet as the positioning ratchet rotates with respect to the base member about the pivot axis.

Advantageously according to the seventeenth aspect of the present invention, the bicycle operating device can be used to operate a cable operated bicycle component.

In accordance with an eighteenth aspect of the present invention, the bicycle operating device according to any one of the fifteenth to seventeenth aspects is configured so that the holding member includes a first holding pawl pivotally mounted with respect to the base member about a pawl pivot axis between a first holding position and a first releasing position. The holding member includes a second holding pawl pivotally mounted with respect to the base member about the pawl pivot axis between a second holding position and a second releasing position.

Advantageously according to the eighteenth aspect of the present invention, the bicycle operating device can be easily operated to perform the releasing operations.

In accordance with a nineteenth aspect of the present invention, the bicycle operating device according to any one of the first to eighteenth aspects further comprises a first operating member selectively moving the holding member from the holding position to the releasing position as the first operating member moves from a first rest position to a first actuated position.

Advantageously according to the nineteenth aspect of the present invention, the bicycle operating device can be easily operated to perform the releasing operations.

In accordance with a twentieth aspect of the present invention, the bicycle operating device according to the nineteenth aspect further comprises a release member and a release pawl. The release member is movably mounted with respect to the base member. The release member selectively moves the holding member from the holding position to the releasing position as the release member moves with respect to the base member. The release pawl is operatively coupled to the first operating member 41, and arranged to move the release member from the holding position to the releasing position as the first operating member moves from the first rest position to the first actuated position.

Advantageously according to the twentieth aspect of the present invention, the releasing operation can be effectively carried out.

In accordance with a twenty-first aspect of the present invention, the bicycle operating device according to any one of the first to twentieth aspects further comprises a second operating member operatively coupled to the positioning ratchet to move the positioning ratchet with respect to the base member in the first direction as the second operating member moves from a second rest position to a second actuated position.

Advantageously according to the twenty-first aspect of the present invention, the bicycle operating device can be easily operated to perform a pulling operation.

In accordance with a twenty-second aspect of the present invention, the bicycle operating device according to the twenty-first aspect further comprises a pulling member and a pulling pawl. The pulling member is movably mounted with respect to the base member. The pulling member moves the positioning ratchet in the first direction as the pulling member moves with respect to the base member. The pulling pawl is movably mounted on the second operating member. The pulling pawl contacts the pulling member and moves the pulling member as the second operating member moves from the second rest position to the second actuated position.

Advantageously according to the twenty-second aspect of the present invention, the pulling operation can be effectively carried out.

In accordance with a twenty-third aspect of the present invention, the bicycle operating device according to any one of the first to twenty-second aspects further comprises a friction member contacting the restricting member to maintain the restricting member in one of the non-restricting position and the at least one restricting position.

Advantageously according to the twenty-third aspect of the present invention, the restricting member can be effectively retained in the non-restricting position and the at least one restricting position, and the restricting member can still be moved to from one of the non-restricting position and the at least one restricting position to the other of the non-restricting position and the at least one restricting position.

Also, other objects, features, aspects and advantages of the disclosed bicycle operating device will become apparent to those skilled in the art from the following detailed description, which, taken in conjunction with the annexed drawings, discloses illustrative embodiments of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Referring initially to FIGS. 1 to 5, a bicycle operating device 10 is illustrated in accordance with a first embodiment. Here, the bicycle operating device 10 is configured to be mounted to a right side of a handlebar H so as to be operated by rider's right hand. However, the bicycle operating device 10 can be modified to be mounted on the left side of a handlebar H if needed and/or desired. In the illustrated embodiment, the bicycle operating device 10 is configured to be operatively coupled to one of a bicycle component (not shown) via a control cable 12. More specifically, the bicycle operating device 10 is configured as a bicycle gear shifter for controlling the gear positions of a rear gear changing device such as a rear bicycle derailleur or an internally geared hub.

In the first embodiment, as seen in FIGS. 2 and 6 to 8, the bicycle operating device 10 comprises a restricting member 14 that allows a rider (user) to selectively regulate the bicycle operating device 10 between three different sets of the gear positions. More specifically, as explained below, the bicycle operating device 10 is configured and arranged such that the bicycle operating device 10 can be used with three different bicycle drive trains. For example, in this first illustrated embodiment, the bicycle operating device 10 can be used to with either a twelve sprocket rear cassette, an eleven sprocket rear cassette or a ten sprocket rear cassette. Of course, the bicycle operating device 10 can be used to lockout one or two of the sprockets of a twelve sprocket rear cassette as needed and/or desired. Here, the restricting member 14 is accessible without disassembling the bicycle operating device 10. As explain below, the user or rider can regulate the number gear positions of the bicycle operating device 10 by turning the restricting member 14 using a tool (not shown). In this way, the bicycle operating device 10 can be set to twelve gear positions 12S, eleven gear positions 11S or ten gear positions 10S.

Figure 1:
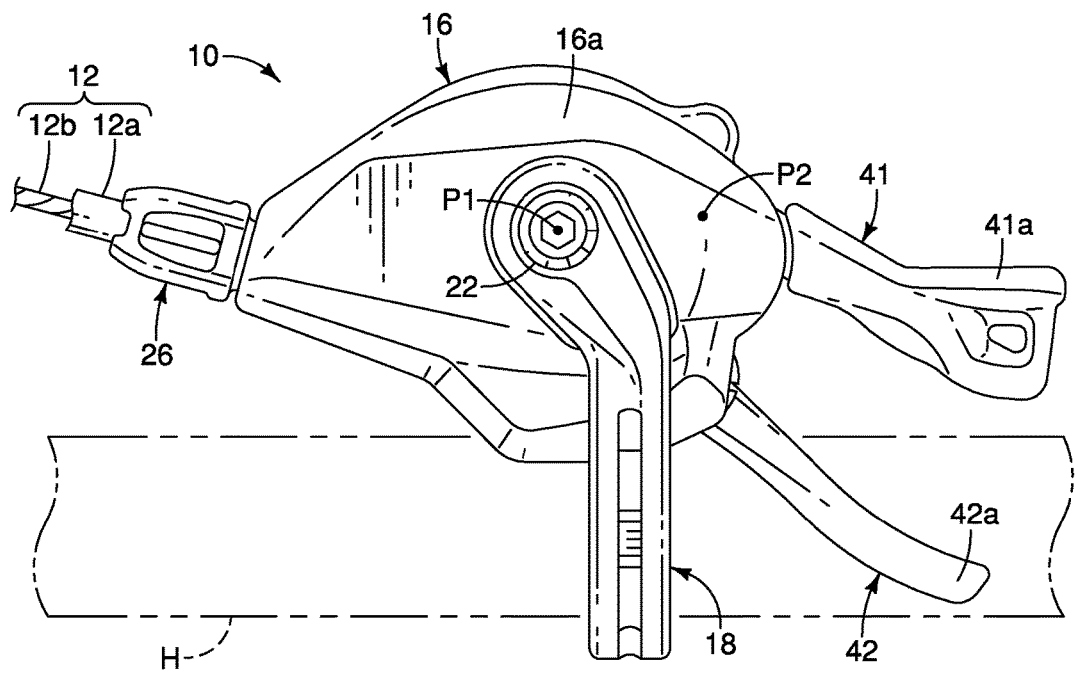
FIG. 1 is a top plan view of a portion of a handlebar with a bicycle operating device in accordance with a first embodiment with first and second operating member in their first and second rest positions, respectively.
Figure 2:
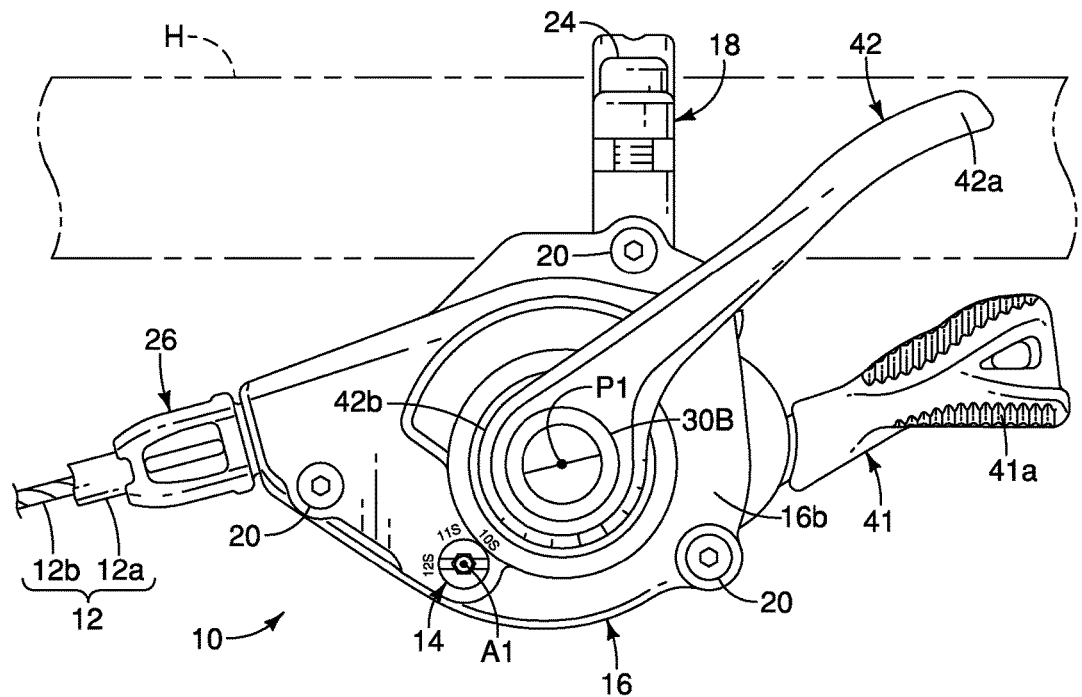
FIG. 2 is a bottom plan view of the bicycle operating device illustrated in FIG. 1 with first and second operating members in their first and second rest positions, respectively.

Preferably, as seen in FIG. 1, the control cable 12 is a conventional bicycle operating cable that has an outer case 12a covering an inner wire 12b. In other words, the control cable 12 is a Bowden type cable in which the inner wire 12b is slidably received within the outer case 12a. The bicycle operating device 10 operates the bicycle component (not shown) by selectively pulling and releasing the inner wire 12b.

As seen in FIGS. 1 to 5, the bicycle operating device 10 includes a housing 16 and a handlebar clamp 18. The housing 16 encloses a cable position maintaining mechanism of the bicycle operating device 10 that holds the inner wire 12b at various predetermined positions as discussed below. The housing 16 also encloses a cable releasing mechanism and a cable pulling mechanism of the bicycle operating device 10 that releases and pulls the inner wire 12b, respectively, between the various predetermined gear positions as discussed below. The restricting member 14 is accessible without disassembling the housing 16. Here, for example, the housing 16 has a two-piece construction having a pair of housing parts 16a and 16b that are fastened together a plurality of screws 20. The housing parts 16a and 16b are hard rigid members constructed of a suitable material such as a hard plastic or a lightweight metal. However, the housing 16 can have a variety of configurations as needed and/or desired. In the first embodiment, the restricting member 14 is accessible through an opening 16b1 in the housing part 16b, which is a bottom housing part when the bicycle operating device 10 is in a mounted state on the handlebar H.

Figure 5:
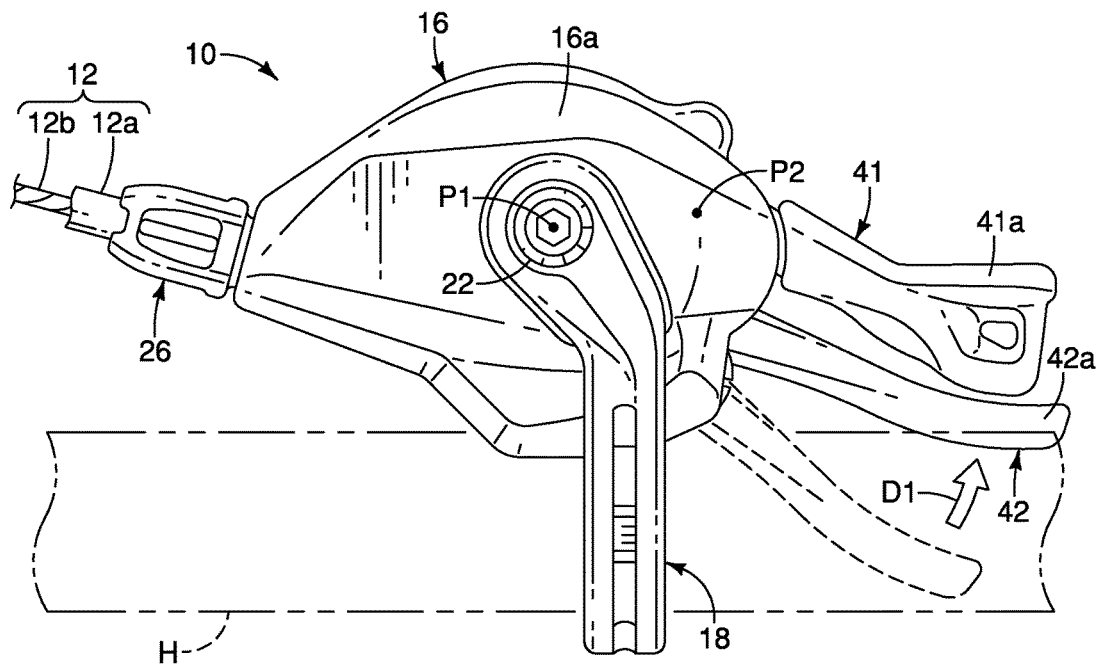
FIG. 5 is a top plan view of the bicycle operating device illustrated in FIGS. 1 to 4 showing the second operating member moved from the second rest position (shown in dashed lines) to a second actuated position (shown in solid lines)
Figure 9:
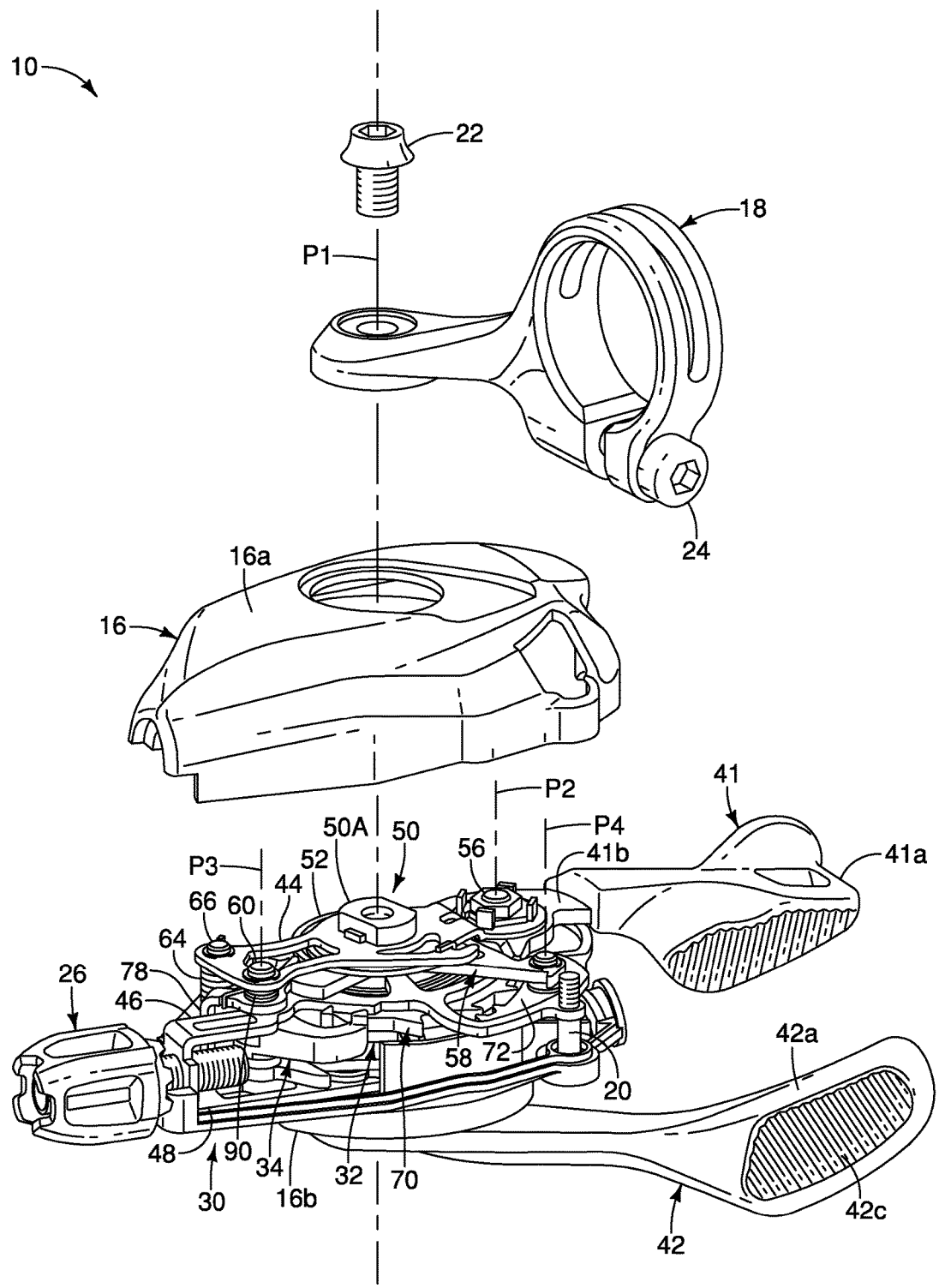
FIG. 9 is a partially exploded perspective view of the bicycle operating device illustrated in FIGS. 1 to 5 to reveal internal parts while the first and second operating members are disposed in the first and second rest positions, respectively.

As can be readily seen in FIGS. 5 and 9, the handlebar clamp 18 is a separate part that is fastened to the housing 16 by a threaded fastener or bolt 22. The handlebar clamp 18 is a conventional tube clamp that constitutes an example of a handlebar mounting member. Here, the handlebar clamp 18 includes a tightening bolt 24 or other tightening members that are configured to squeeze the handlebar clamp 18 onto the handlebar H. Preferably, the bicycle operating device 10 includes a cable adjuster 26 for adjusting the inner wire 12b in a conventional manner.

Figure 10:
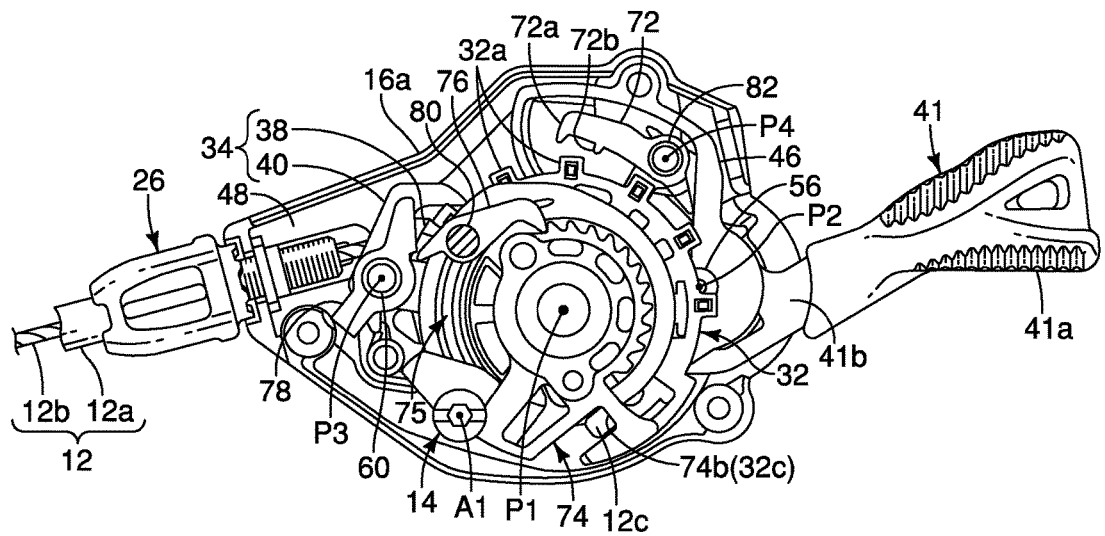
FIG. 10 is a bottom plan view of the bicycle operating device illustrated in FIGS. 1 to 5 with selected parts removed to show the restricting member in a non-restricting position with the illustrated parts in rest positions.

As seen in FIGS. 9 and 10, the bicycle operating device 10 comprises a base member 30, a positioning ratchet 32 and a holding member 34. The base member 30 is considered to include the housing 16, the handlebar clamp 18, and an internal support structure. The internal support structure of the base member 30 basically supports various internal parts of the cable position maintaining mechanism, the cable releasing mechanism and the cable pulling mechanism. Basically, the positioning ratchet 32 is movably mounted with respect to the base member 30. The holding member 34 is movably mounted with respect to the base member 30 to selectively engage the positioning ratchet 32 to establish a plurality of gear positions.

The positioning ratchet 32 is configured to move the first direction D1 and a second direction D2 that is opposite to the first direction D1. In the first embodiment, the first direction D1 corresponds to an inner wire pulling direction, and the second direction D2 corresponds to an inner wire releasing direction. Preferably, the positioning ratchet 32 is movably mounted with respect to the base member 30 about a pivot axis P1. Specifically, the positioning ratchet 32 is rotatably mounted with respect to the base member 30 about the pivot axis P1.

Basically, as explained below, the holding member 34 is movably mounted with respect to the base member 30 between a holding position (solid lines in FIGS. 11, 13 and 15) and a releasing position (shown in dashed lines in FIGS. 13 and 15) to selectively establish a plurality of gear positions of the positioning ratchet 32. Preferably, the holding member 34 is movably mounted with respect to the base member 30 between the holding position and the releasing position to selectively establish at least four gear positions. In other words, while the positioning ratchet 32 and the holding member 34 are configured to establish a total of twelve gear positions in the first embodiment, the positioning ratchet 32 and the holding member 34 can be reconfigured to establish a total of only four gear positions. Thus, broadly speaking, the holding member 34 selectively establishes at least four gear positions.

Figure 11:
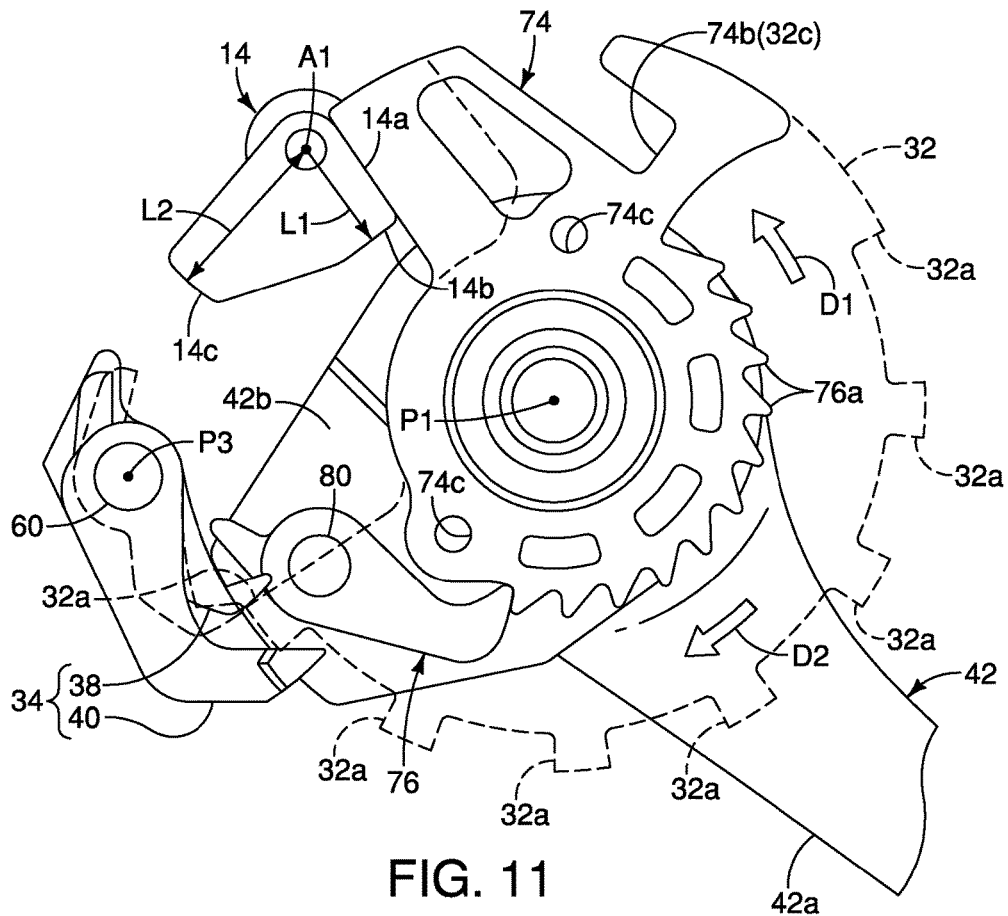
FIG. 11 is an enlarged top plan view of the selected parts of the bicycle operating device illustrated in FIG. 10 in their rest positions and showing the restricting member in the non-restricting position.
Figure 12:
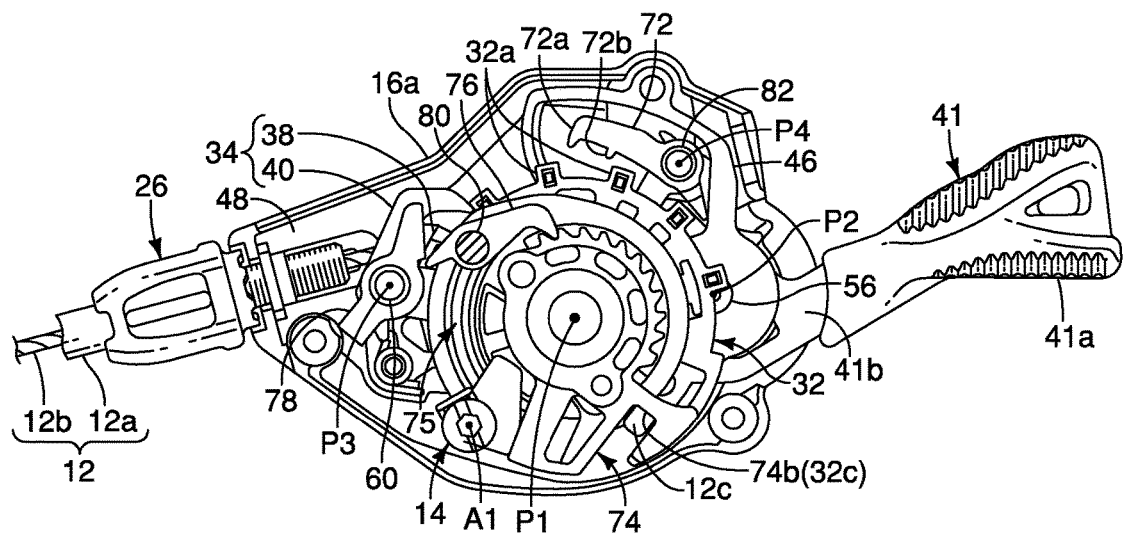
FIG. 12 is a bottom plan view, similar to FIG. 10, of selected parts of the bicycle operating device but showing the restricting member in a first restricting position with the illustrated parts in rest positions.
Figure 13:
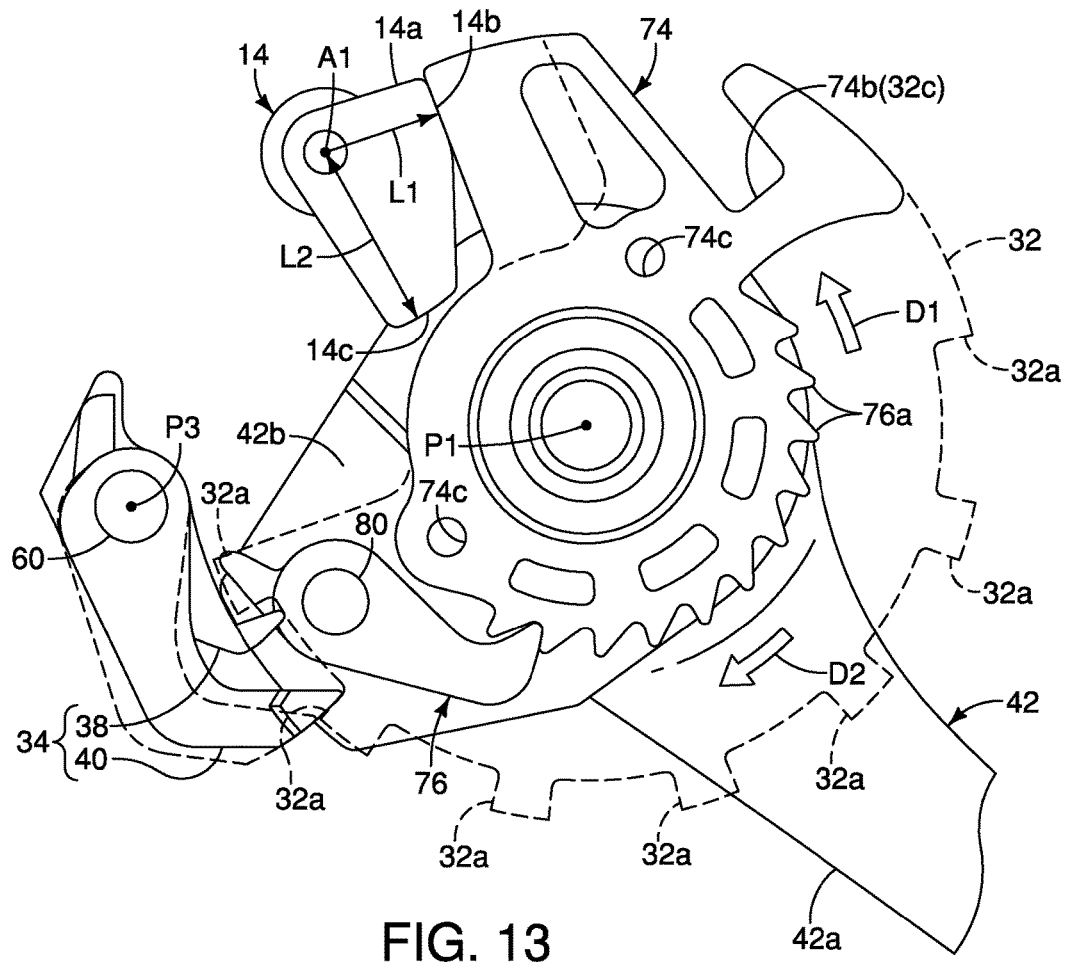
FIG. 13 is an enlarged top plan view of the selected parts of the bicycle operating device illustrated in FIG. 12 in their rest positions and showing the restricting member in the first restricting position.
Figure 14:
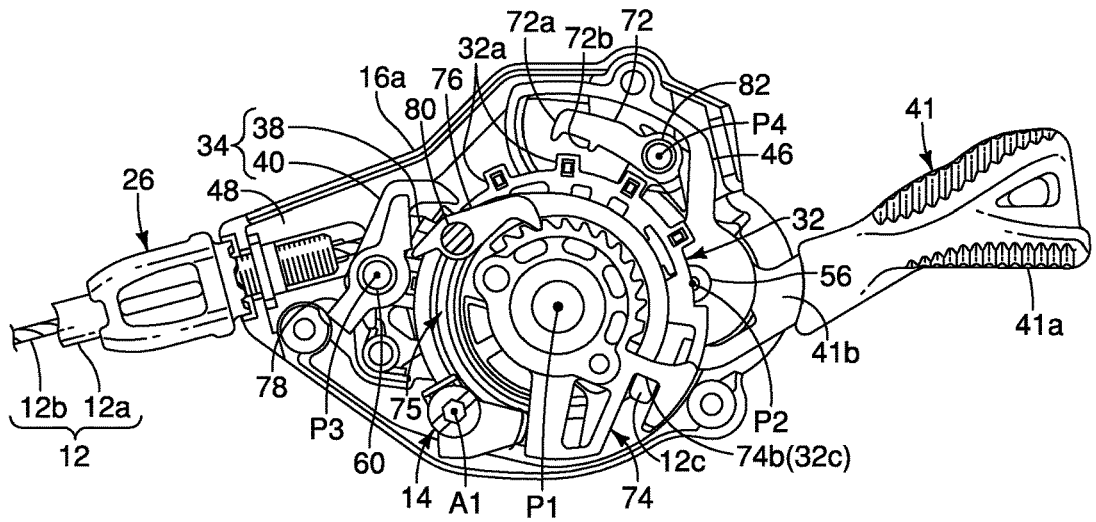
FIG. 14 is a bottom plan view, similar to FIGS. 10 and 12, of selected parts of the bicycle operating device but showing the restricting member in a second restricting position.
Figure 15:
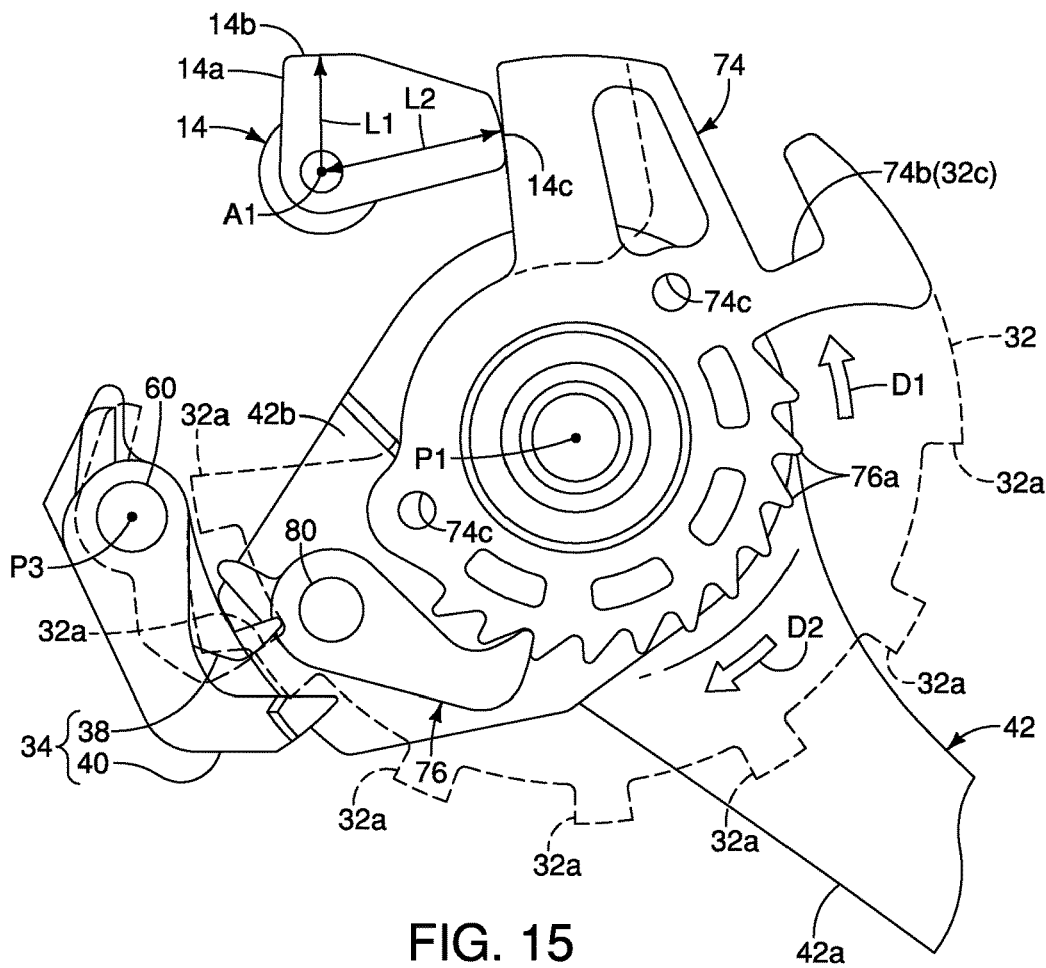
FIG. 15 is an enlarged top plan view of the selected parts of the bicycle operating device illustrated in FIG. 14 in their rest positions and showing the restricting member in the second restricting position.

As seen in FIGS. 11 to 15, the restricting member 14 is pivotally mounted with respect to the base member 30 about a mounting axis A1. The restricting member 14 is movably mounted with respect to the base member 30 between a non-restricting position (FIG. 11) and at least one restricting position (FIGS. 13 and 15). Basically, the restricting member 14 is configured to restrict movement of the positioning ratchet 32 in the first direction D1 while the restricting member 14 is in the restricting position. In other words, the restricting member 14 is configured to restrict movement of the positioning ratchet 32 in the first direction D1 about the pivot axis P1 while the restricting member 14 is in the restricting position. In this way, while the restricting member 14 is in the restricting position, the holding member 34 cannot engage the positioning ratchet 32 to establish all of the possible gear positions of the bicycle operating device 10.

The bicycle operating device 10 further comprises a friction member 36 contacting the restricting member 14 to maintain the restricting member 14 in one of the non-restricting position and the at least one restricting position. The friction member 36 applies a contact force perpendicular to the mounting axis A1 to frictionally prevent movement of the restricting member 14 with respect to the base member 30 until a user applies an override force with a tool to turn the restricting member 14 about the mounting axis A1. In other words, the restricting member 14 is overrideably retained with respect to the base member 30. The friction member 36 also aids in retaining the restricting member 14 to the base member 30 during assembly of the bicycle operating device 10. Here, the friction member 36 is a metal wire that has a pair of legs that contact the friction member 36 to apply a pair of contact forces perpendicular to the mounting axis A1. The friction member 36 is provided with a circumferential groove 14d of the restricting member 14 for receiving the legs of the friction member 36. The circumferential groove 14d includes at least two pair of parallel grooves to maintain the restricting member 14 in one of the non-restricting position and the at least one restricting position. It will be apparent from this disclosure that the friction member can have a variety of structures. For example, the friction member can be configured to apply an overrideable axial force to the restricting member 14 to overrideably retain the restricting member 14 with respect to the base member 30. Examples of friction members that provide an overrideable axial force to the restricting member 14 include an elastic O-ring, a coil spring, a Belleville washer, etc. that are mounted on the restricting member 14 and around the mounting axis A1.

Figure 6:
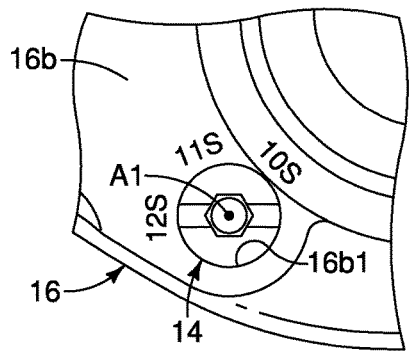
FIG. 6 is a partial bottom plan view of the bicycle operating device illustrated in FIGS. 1 to 5 showing a restricting member in a non-restricting position to permit the bicycle operating device to selectively establish twelve gear positions.
Figure 7:
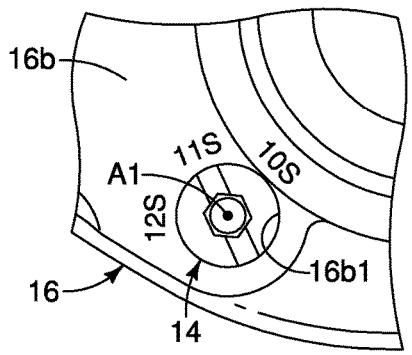
FIG. 7 is a partial bottom plan view, similar to FIG. 6, of the bicycle operating device illustrated in FIGS. 1 to 5 showing the restricting member in a first restricting position to permit the bicycle operating device to selectively establish eleven gear positions but preventing establish one of the twelve possible gear positions.
Figure 8:
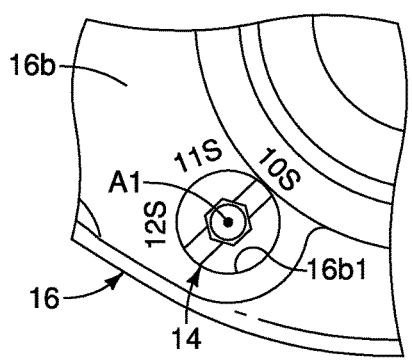
FIG. 8 is a partial bottom plan view, similar to FIGS. 6 and 7, of the bicycle operating device illustrated in FIGS. 1 to 5 showing the restricting member in a second restricting position to permit the bicycle operating device to selectively establish ten gear positions but preventing establish two of the twelve possible gear positions.

In the first embodiment, as seen in FIGS. 10 to 15, the restricting member 14 is movably mounted with respect to the base member 30 between a non-restricting position and at least two restricting positions to establish at least three different sets of the gear positions. Thus, the positioning ratchet 32 is arranged to move in at least two additional sets of the at least three different sets of the gear positions while the restricting member 14 is positioned in the at least two restricting positions, respectively. In other words, the at least one restricting position includes a first restricting position and a second restricting position to establish at least three different sets of the gear positions. The first restriction surface 14b is located a first linear distance L1 from the mounting axis A1 of the restricting member 14. The second restriction surface 14c is located a second linear distance L2 from the mounting axis A1 of the restricting member 14. The second linear distance L2 is longer than the first linear distance L1. Preferably, as seen in FIGS. 6 to 8, the housing part 16b is provided with indicia (i.e., indicia 12S, 11S and 10S) to indicate when the restricting member 14 is in the non-restricting position (i.e., 12S), the first restricting position (i.e., 11S) and the second restricting position (i.e., 10S).

The restricting member 14 is configured to contact a part fixed to the positioning ratchet 32 so that the restricting member 14 restricts movement of the positioning ratchet 32 in the first direction D1 while the restricting member 14 is in the restricting position. Here, in the first embodiment, the restricting member 14 includes a non-restriction surface 14a that does not restrict the engagement of the holding member 34 with the positioning ratchet 32 to establish each of the gear positions. When the restricting member 14 is in the non-restricting position as seen in FIGS. 10 and 11, the positioning ratchet 32 can either contact (as shown) or be spaced from the non-restriction surface 14a when the positioning ratchet 32 is in a fully pulled position to establish an end gear position (later referred to as a first gear position). In other words, when the restricting member 14 is in the non-restricting position and the positioning ratchet 32 is rotated as far as possible in first direction D1, the holding member 34 engages the positioning ratchet 32 to establish the new end gear position (later referred to as the first gear position).

In the first embodiment, the restricting member 14 includes a first restriction surface 14b that restricts movement of the positioning ratchet 32 in the first direction D1 while the restricting member 14 is positioned in the first restricting position as seen in FIGS. 12 and 13. Here, the restricting member 14 further includes a second restriction surface 14c that restricts movement of the positioning ratchet 32 in the first direction D1 while the restricting member 14 is positioned in the second restricting position as seen in FIGS. 14 and 15. Alternatively, the restricting member 14 includes only one of the first and second restriction surfaces 14b and 14c. In other words, broadly speaking, the restricting member 14 includes a restriction surface (either the first restriction surface 14b or the second restriction surface 14c) that restricts movement of the positioning ratchet 32 in the first direction D1 while the restricting member 14 is positioned in the at least one restricting position. In this way, when the restricting member 14 is in the first restricting position as seen in FIGS. 12 and 13, the first restriction surface 14b prevents full rotation the positioning ratchet 32 in the first direction D1 such that the positioning ratchet 32 cannot reach a fully pulled position. Rather, when the restricting member 14 is in the first restricting position and the positioning ratchet 32 is rotated as far as possible in first direction D1, the holding member 34 engages the positioning ratchet 32 to establish a new end gear position (later referred to as a second gear position). Also, when the restricting member 14 is in the second restricting position as seen in FIGS. 14 and 15, the second restriction surface 14c prevents full rotation the positioning ratchet 32 in the first direction D1 such that the positioning ratchet 32 cannot reach a fully pulled position. When the restricting member 14 is in the second restricting position and the positioning ratchet 32 is rotated as far as possible in first direction D1, the holding member 34 engages the positioning ratchet 32 to establish a new end gear position (later referred to as a third gear position).

While the restricting member 14 includes the first restriction surface 14b and the second restriction surface 14c, the restricting member 14 can be configured without the first restriction surface 14b. If the first restriction surface 14b is omitted then the first set of the gear positions would include all twelve of the gear positions, and the second of the gear positions would include ten of the twelve of the gear positions. In other words, in this case, the first set of the gear positions includes the second gear position, and the second set of the gear positions not includes the second gear position.

In the first embodiment, by using the restricting member 14, the user or rider can selectively set the bicycle operating device 10 such that the positioning ratchet 32 is arranged to move in a first set of the gear positions while the restricting member 14 is positioned in the non-restricting position. The first set of the gear positions is established by turning the restricting member 14 to align a slot with the indicia 12S of the housing part 16b that corresponds to the non-restricting position as seen in FIG. 6.

Also in the first embodiment, by using the restricting member 14, the user or rider can selectively set the bicycle operating device 10 such that the positioning ratchet 32 is arranged to move in a second set of the gear positions while the restricting member 14 is positioned in the at least one restricting position. In particular, the positioning ratchet 32 is arranged to move in the second set of the gear positions while the restricting member 14 is in the first restricting position. The second set of the gear positions is established by turning the restricting member 14 to align a slot with the indicia 11S of the housing part 16b that corresponds to the first restricting position as seen in FIG. 7. The second set of the gear positions has a fewer total number of the gear positions than a total number of the gear positions of the first set of the gear positions. Here, the first set of the gear positions includes twelve predetermined gear positions, while the second set of the gear positions includes eleven predetermined gear positions. With this arrangement, the positioning ratchet 32 is arranged to move in the second set of the gear positions not including the first gear position while the restricting member 14 is positioned in the at least one restricting position.

Also in the first embodiment, by using the restricting member 14, the user or rider can selectively set the bicycle operating device 10 such that the positioning ratchet 32 is arranged to move in a third set of the gear positions while the restricting member 14 is in the second restricting position. The third set of the gear positions is established by turning the restricting member 14 to align a slot with the indicia 10S of the housing part 16b that corresponds to the second restricting position as seen in FIG. 8. The third set of the gear positions has a fewer total number of the gear positions than the total number of the gear positions of the second set of the gear positions. Here, the third set of the gear positions includes ten predetermined gear positions.

As best seen in FIGS. 10 to 15, the positioning ratchet 32 is basically a rigid plate that is made of a suitable material such as, for example, a metallic material. The positioning ratchet 32 includes a plurality of positioning abutments 32a circumferentially arranged with respect to the pivot axis P1. The positioning abutments 32a are selectively engaged with the holding member 34 to selectively establish the gear positions. As mentioned above, the positioning ratchet 32 is movable between different ones of the gear positions depending on whether the restricting member 14 is positioned in the non-restricting position or one of the first and second restricting positions. The gear positions including a first gear position and a second gear position. The second gear position is sequentially arranged adjacent and downstream of the first gear position as the positioning ratchet 32 moves in the first direction D1 from the first gear position to the second gear position. Thus, the first gear position corresponds to the endmost gear position in a fully pulled position of the positioning ratchet 32, while the second gear position corresponds to an adjacent gear position of the endmost gear position. The positioning ratchet 32 is arranged to move in the second set of the gear positions not including the first gear position while the restricting member 14 is positioned in the at least one restricting position. Namely, when the restricting member 14 is positioned in the first restricting position, the bicycle operating device 10 can be operated in the second set of the gear positions that does not include the first gear position.

Figure 16:
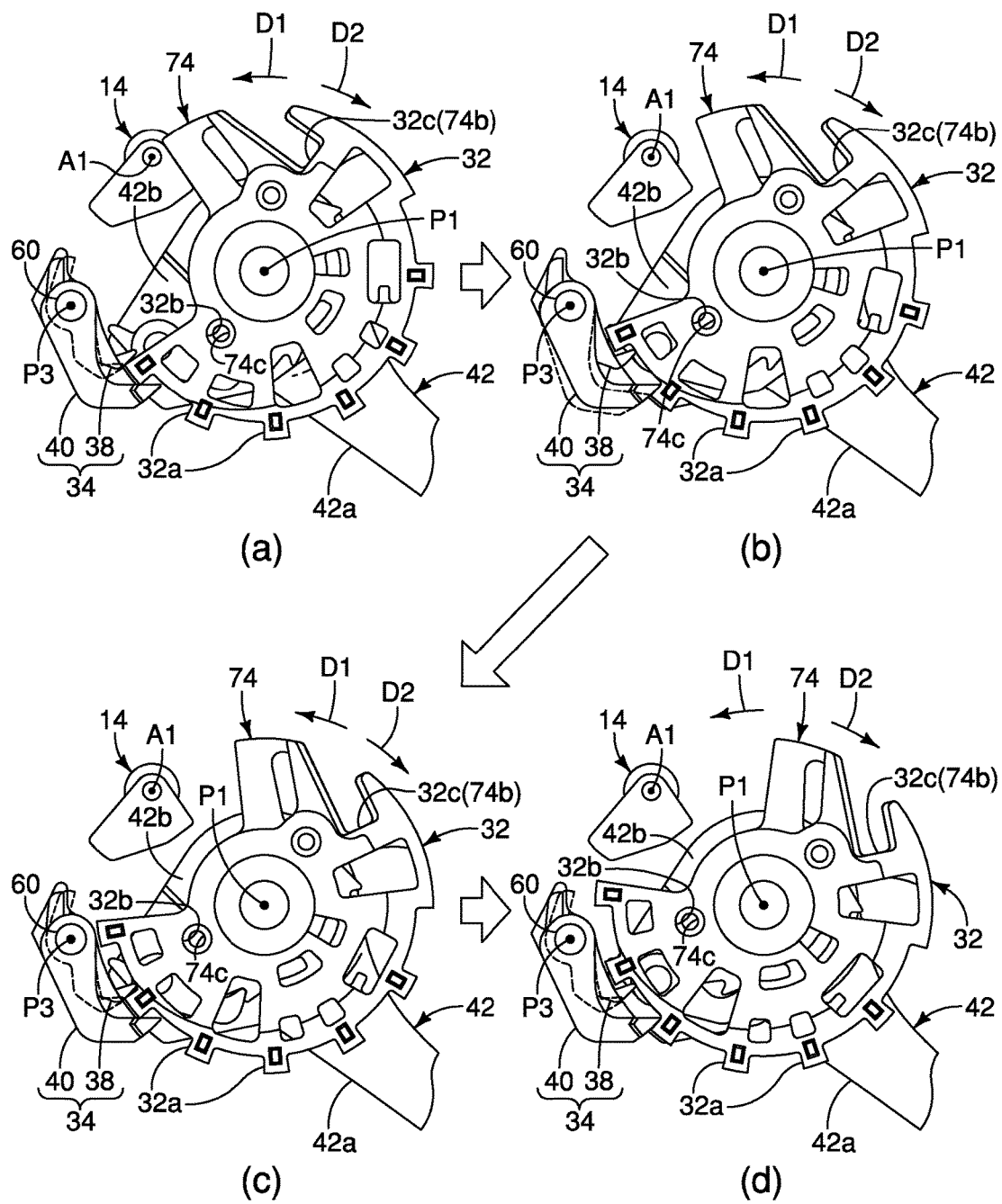
FIG. 16 is a series of enlarged top plan views of the selected parts of the bicycle operating device showing a four gear positions (i.e., first to fourth gear positions) of the bicycle operating device.
Figure 17:
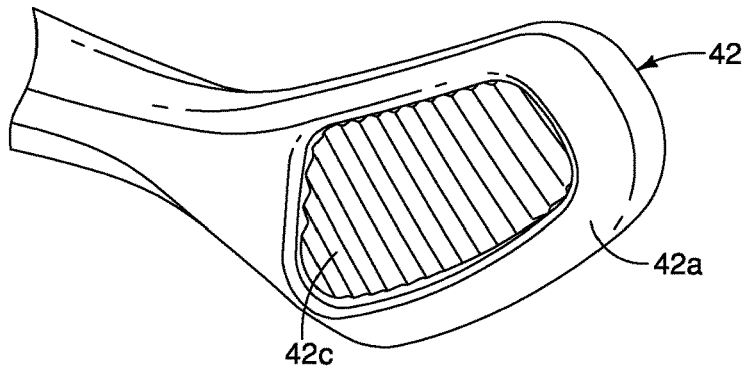
FIG. 17 is a partial perspective view of the second operating member of the bicycle operating device illustrated in FIGS. 1 to 5 as viewed from a user engagement side.
Figure 18:
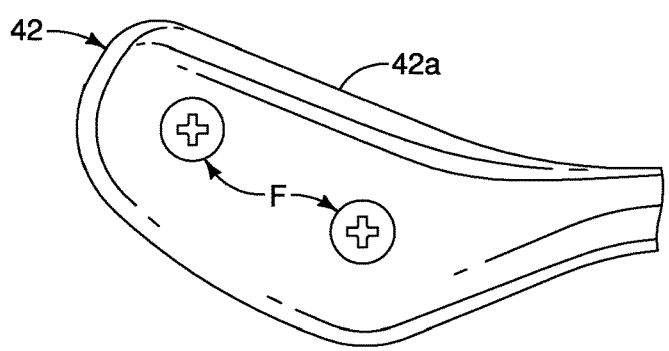
FIG. 18 is a partial perspective view of the second operating member illustrated in FIG. 17 as viewed from a non-user engagement side.
Figure 19:
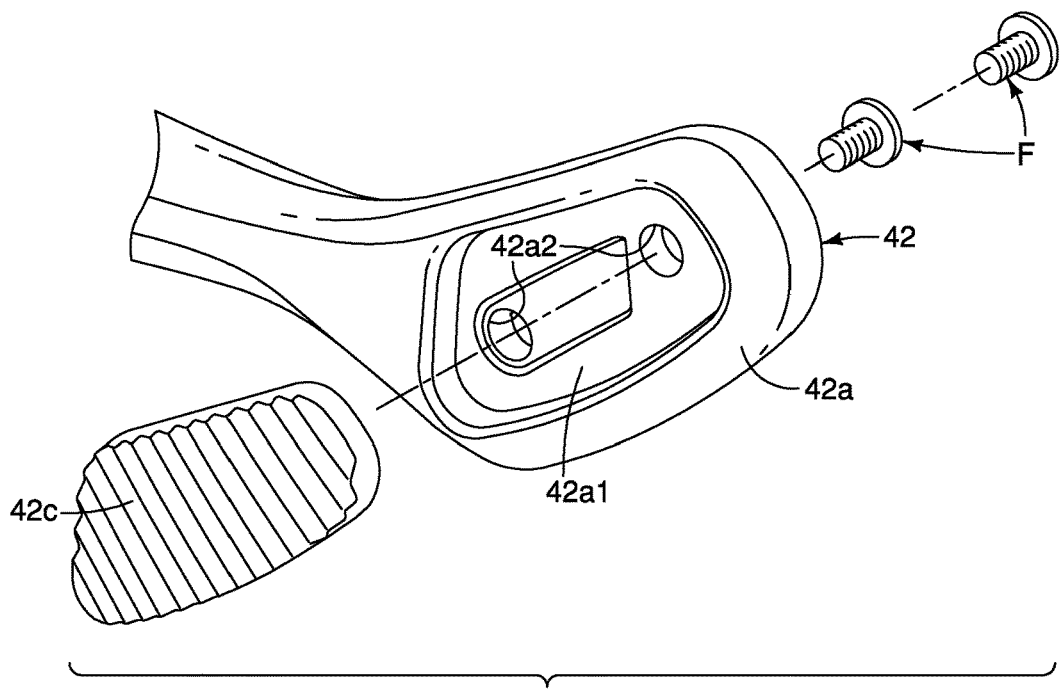
FIG. 19 is an exploded perspective view of the second operating member of illustrated in FIG. 17 as viewed from the user engagement side.

As best seen in FIG. 16, the holding member 34 prevents movement of the positioning ratchet 32 in the second direction D2 while the holding member 34 is in the holding position. The holding member 34 releases the positioning ratchet 32 for movement in the second direction D2 while the holding member 34 is in the releasing position. The holding member 34 holds the positioning ratchet 32 in one of the gear positions while the holding member 34 is in the holding position.

The holding member 34 includes a first holding pawl 38 pivotally mounted with respect to the base member 30 about a pawl pivot axis P2 between a first holding position and a first releasing position. The holding member 34 includes a second holding pawl 40 pivotally mounted with respect to the base member 30 about the pawl pivot axis P2 between a second holding position and a second releasing position. While the holding member 34 includes two holding pawls in the bicycle operating device 10 of the first embodiment, it will be apparent from this disclosure that the holding member 34 can be a single pawl if needed and/or desired. If a single holding pawl is used, then the number of the positioning abutments 32a would need to be increased to obtain the same number of gear positions.

In the first embodiment, examples mechanisms for holding, pulling and releasing the inner wire 12b are illustrated. However, the invention is not limited to the illustrated mechanisms for holding, pulling and releasing the inner wire 12b. Rather, the bicycle operating device 10 can be configured with other mechanisms for holding, pulling and releasing the inner wire 12b in which a positioning ratchet is restricted from by a restricting member to establish at least two different sets of gear positions. The bicycle operating device 10 of the first embodiment uses inner wire holding, pulling and releasing mechanisms that are basically the same as the inner wire holding, pulling and releasing mechanisms disclosed in U.S. patent application Ser. No. 15/450,759, filed Mar. 6, 2017, but which have been modified to accommodate the restricting member 14.

Figure 3:
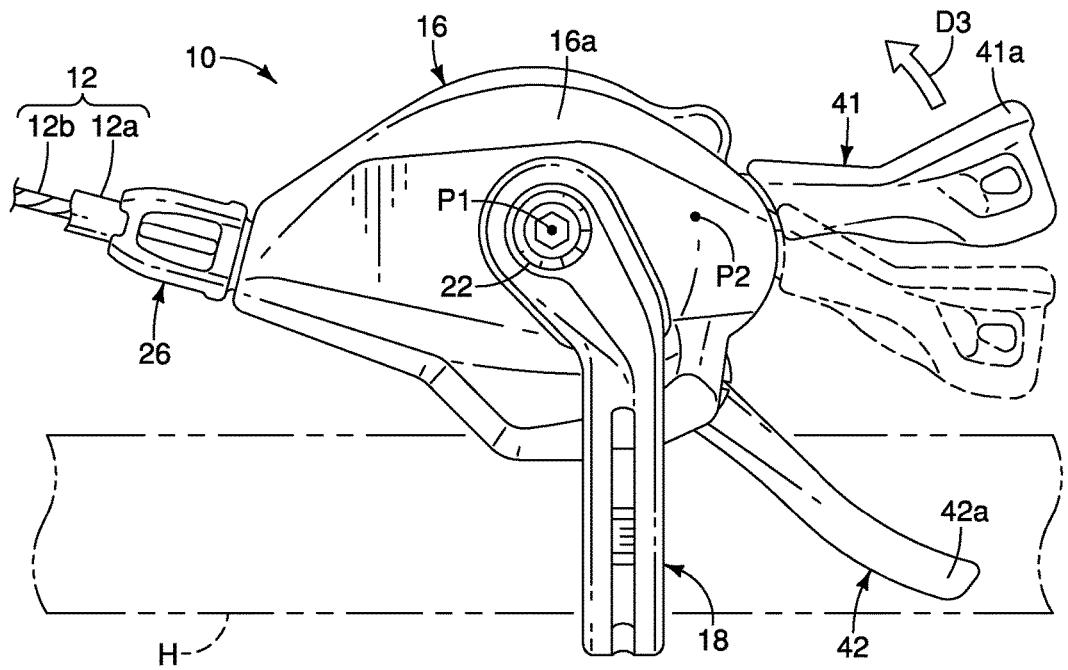
FIG. 3 is a top plan view of the bicycle operating device illustrated in FIGS. 1 and 2 showing a first operating member moved in a first operating direction from the first rest position (shown in dashed lines) to a first actuated position (shown in solid lines)
Figure 4:
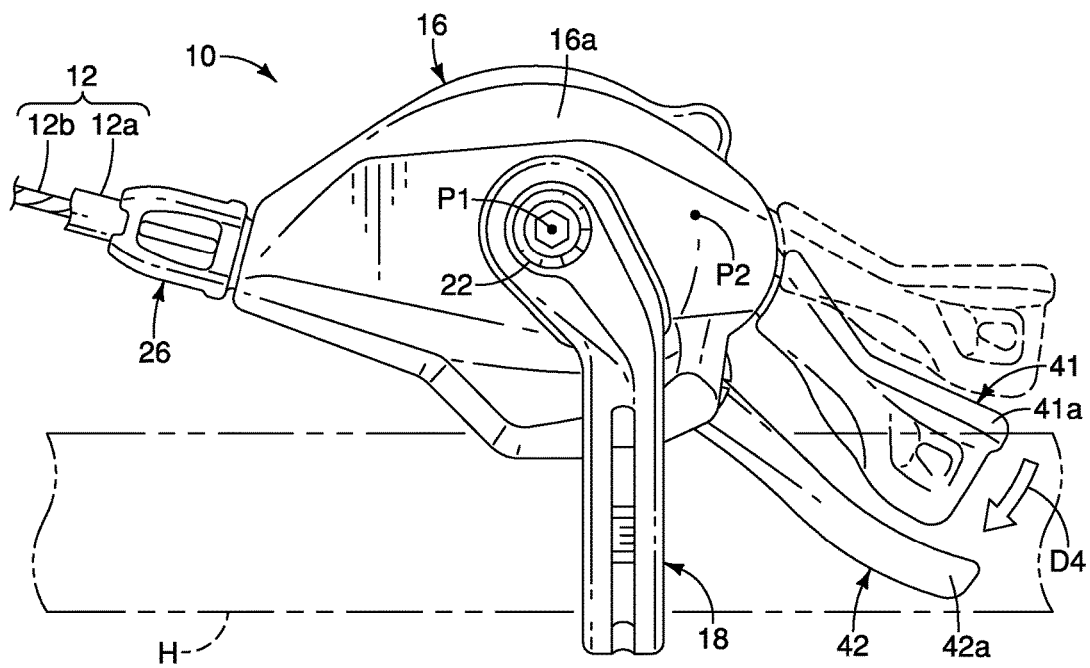
FIG. 4 is a top plan view of the bicycle operating device illustrated in FIGS. 1 to 3 showing the first operating member moved in a second operating direction from the first rest position (shown in dashed lines) to another first actuated position (shown in solid lines)

The bicycle operating device 10 further comprises a first operating member 41 selectively moving the holding member 34 from the holding position to the releasing position as the first operating member 41 moves from a first rest position (FIGS. 1 and 2) to a first actuated position (FIGS. 3 and 4). The first operating member 41 is used to release the inner wire 12b from the housing 16. As explained below, the first operating member 41 has at least two of the first actuated positions. The first operating member 41 includes a user operating part 41a that is completely located outside of the housing 16 for the user or rider to pivot the first operating member 41 with respect to the housing 16. The first operating member 41 constitutes a release lever for releasing the inner wire 12b from the housing 16 as the first operating member 41 is moved by the user from the first rest position to a first actuated position.

As seen in FIGS. 9 and 10, the first operating member 41 further includes a mounting part 41b that is configured to be located inside of the housing 16 and movably mounted to the internal support structure of the base member 30. Here, the user operating part 41a is molded onto an end of the mounting part 41b that extends outside of the housing 16. The term "rest position" as used herein refers to a state in which a movable part (e.g., the first operating member 41) remains stationary without the need of a user intervening (e.g., holding the first operating member 41) to establish a state corresponding to the rest position. Thus, the term "rest position" can also be referred to as a non-operated position.

In the first embodiment, the bicycle operating device 10 further comprises a second operating member 42 operatively coupled to the positioning ratchet 32 to move the positioning ratchet 32 with respect to the base member 30 in the first direction as the second operating member 42 moves from a second rest position (FIGS. 1 to 4) to a second actuated position (FIG. 5). The second operating member 42 is used to pull the inner wire 12b into the housing 16. Thus, the second operating member 42 constitutes a pulling lever for pulling the inner wire 12b into the housing 16 as the second operating member 42 is moved by the user from the second rest position to a second actuated position. However, it will be apparent to those skilled in the bicycle field that the restrictor can be used with a bicycle operating device that only has a single operating member that is used for both releasing and pulling the inner wire 12b.

The second operating member 42 includes a user operating part 42a that is completely located outside of the housing 16 for the user or rider to pivot the second operating member 42 with respect to the housing 16. The second operating member 42 further includes a mounting part 42b that is located inside of the housing 16 and movably mounted to the internal support structure (e.g., the support shaft 50 as in the illustrated embodiment).

Figure 20:
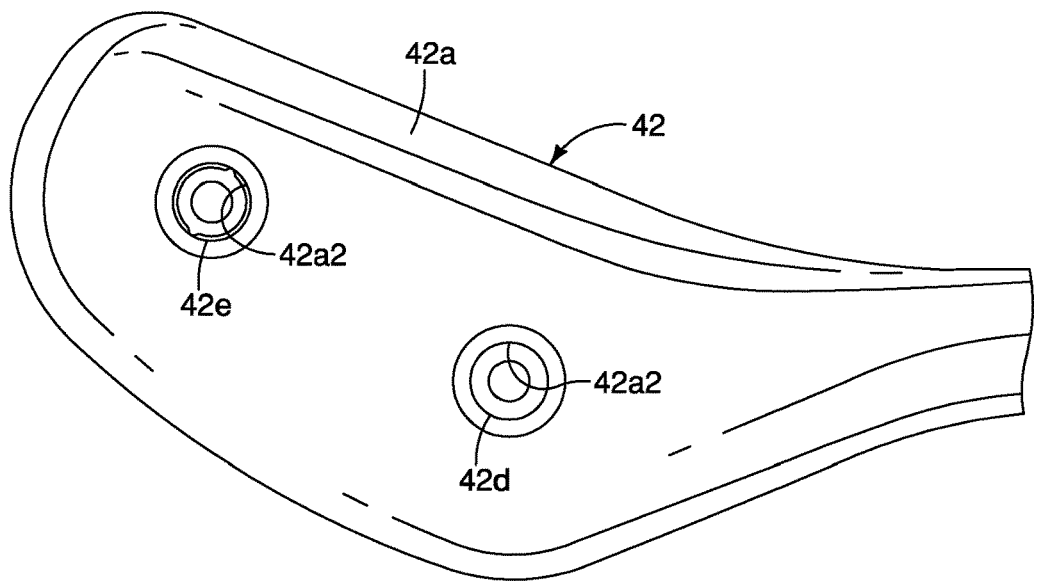
FIG. 20 is an oblique view of the second operating member illustrated in FIGS. 17 to 19 as viewed from the non-user engagement side in which the mounting screws have been removed.
Figure 21:
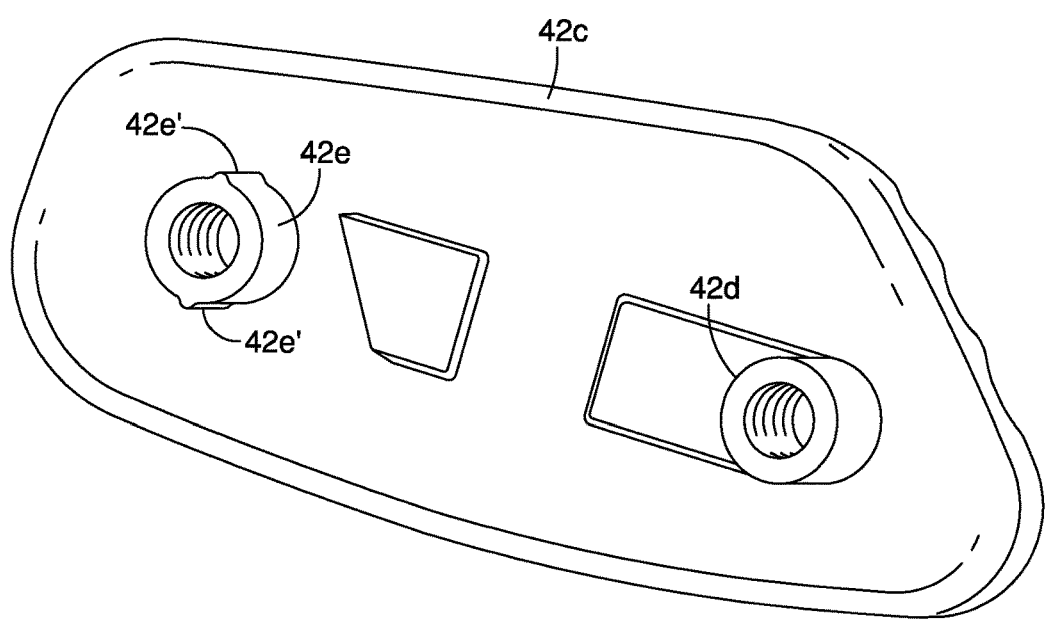
FIG. 21 is a rear side perspective view of the textured pad of the second operating member illustrated in FIGS. 17 and 19.

The user operating part 42a has a user contact pad 42c that is mounted in a recess 42a1. The user contact pad 42c is position on the user operating part 42a along the area that the user contacts during operation of the second operating member 42. Here, the user operating part 42a is made of a hard plastic material, while the user contact pad 42c is made of a rubber or elastomeric material. Preferably, the user contact pad 42c is attached to the user operating part 42a by a pair of threaded fasteners F (i.e., screws). Here, as seen in FIGS. 20 and 21, the user contact pad 42c has a first fastener receiving tube 42d for threadedly receiving one of the threaded fasteners F and a second fastener receiving tube 42e for threadedly receiving the other one of the threaded fasteners F. During attachment of the user contact pad 42c to the user operating part 42a, the first and second fastener receiving tubes 42d and 42e are inserted into openings 42a2 of the user operating part 42a. The first fastener receiving tube 42d is dimensioned to be substantially identical in shape and size as the opening 42a2, while the second fastener receiving tube 42e has a pair of protrusions 42e that are dimensioned to provide an interference with the opening 42a2. In this way, the first and second fastener receiving tubes 42d and 42e do not need to be precisely manufactured to fit the openings 42a2.

Figure 23:
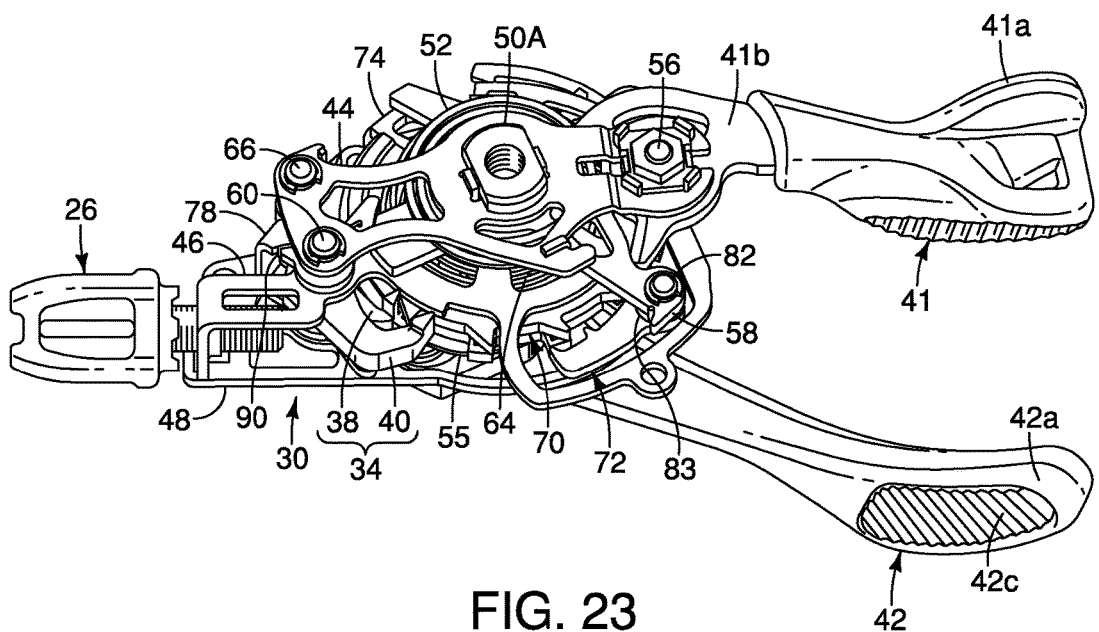
FIG. 23 is a top side perspective view of the selected parts of the bicycle operating device illustrated in FIG. 22 while the first and second operating members are disposed in the first and second rest positions, respectively.
Figure 24:
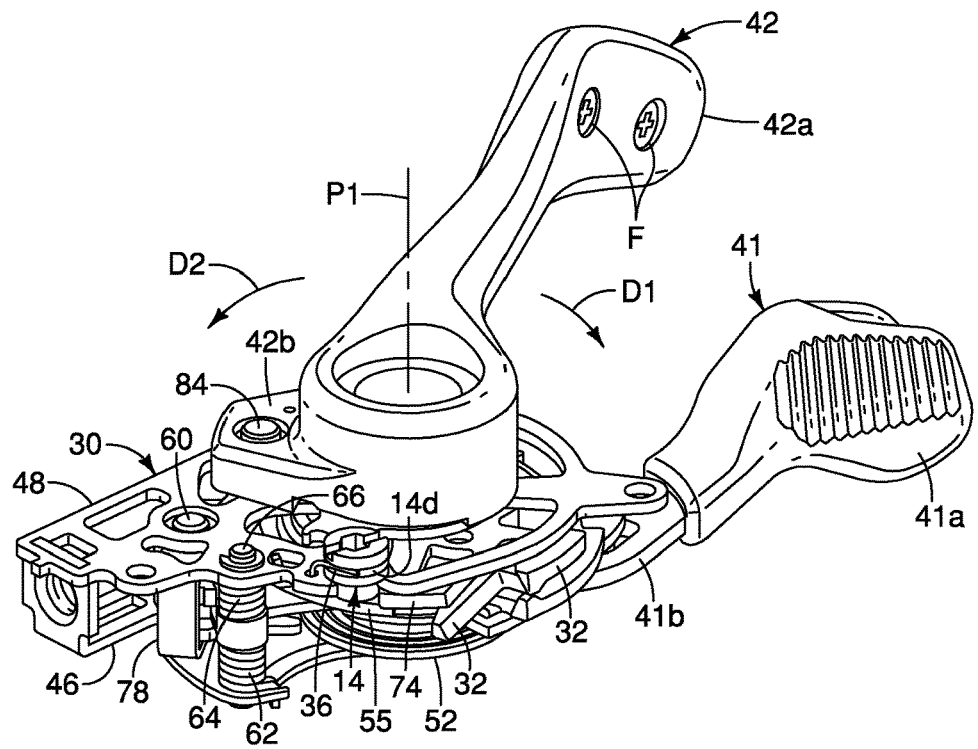
FIG. 24 is a bottom side perspective view of the selected parts of the bicycle operating device illustrated in FIGS. 22 and 23 with the housing remove to reveal the internal parts while the first and second operating members are disposed in the first and second rest positions, respectively.
Figure 25:
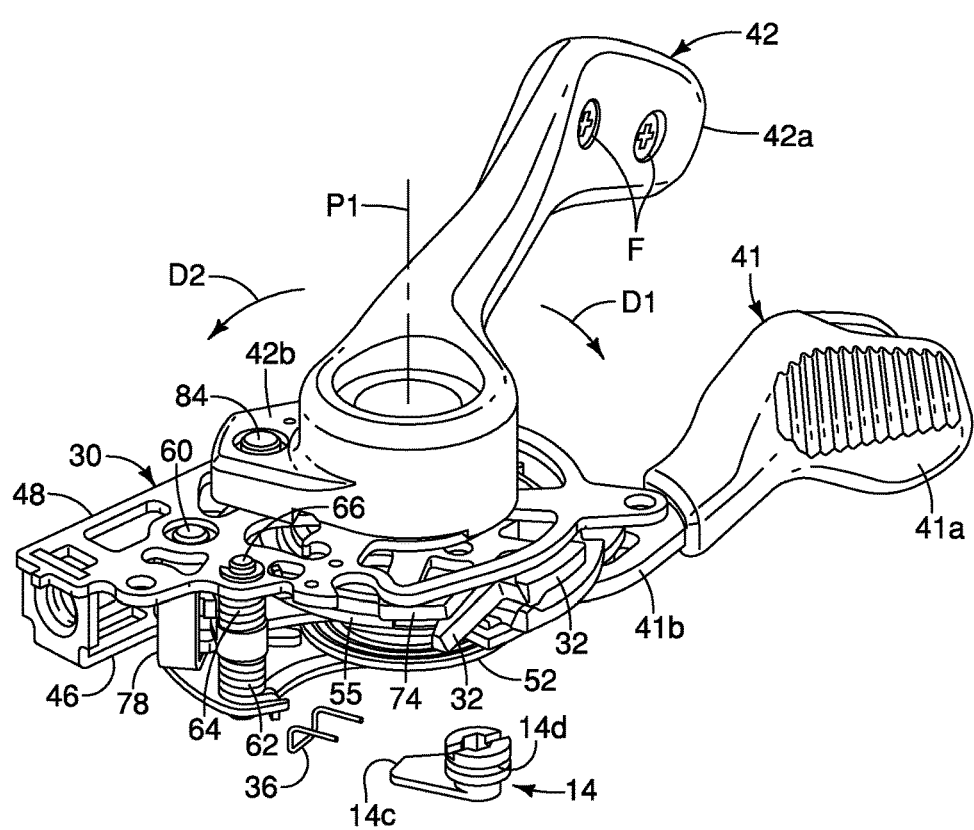
FIG. 25 is a bottom side perspective view of the selected part of the bicycle operating device of illustrated in FIG. 24 showing the restricting member exploded from an internal support structure of the bicycle operating device.
Figure 26:
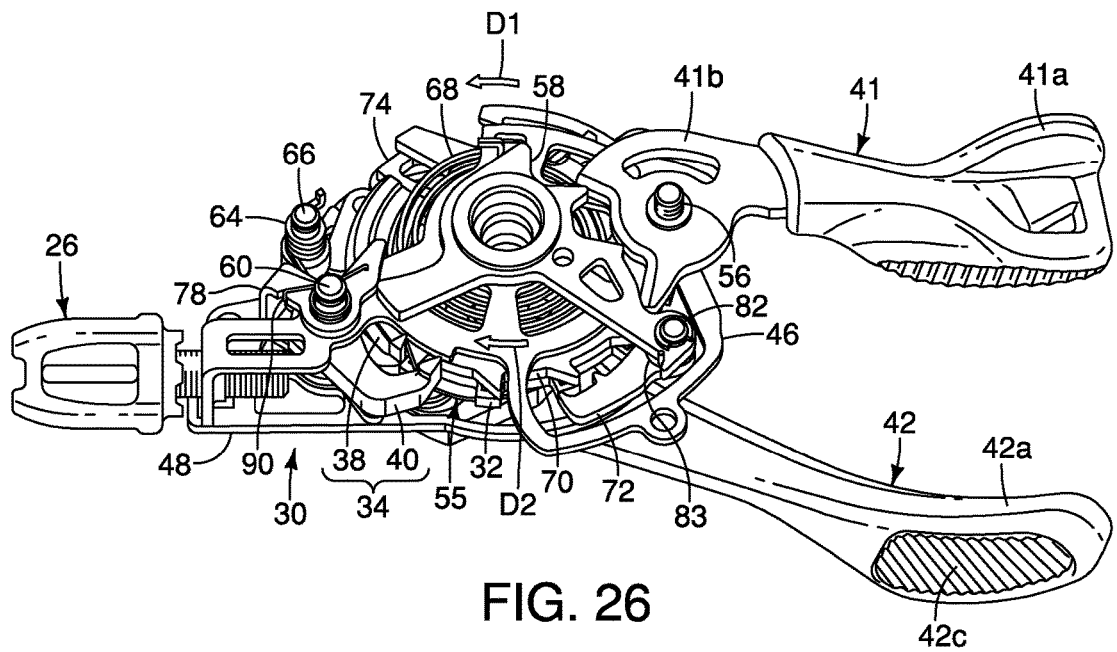
FIG. 26 is a top side perspective view, similar to FIG. 23, of selected parts of the bicycle operating device illustrated in FIG. 23, but with additional parts removed.
Figure 30:
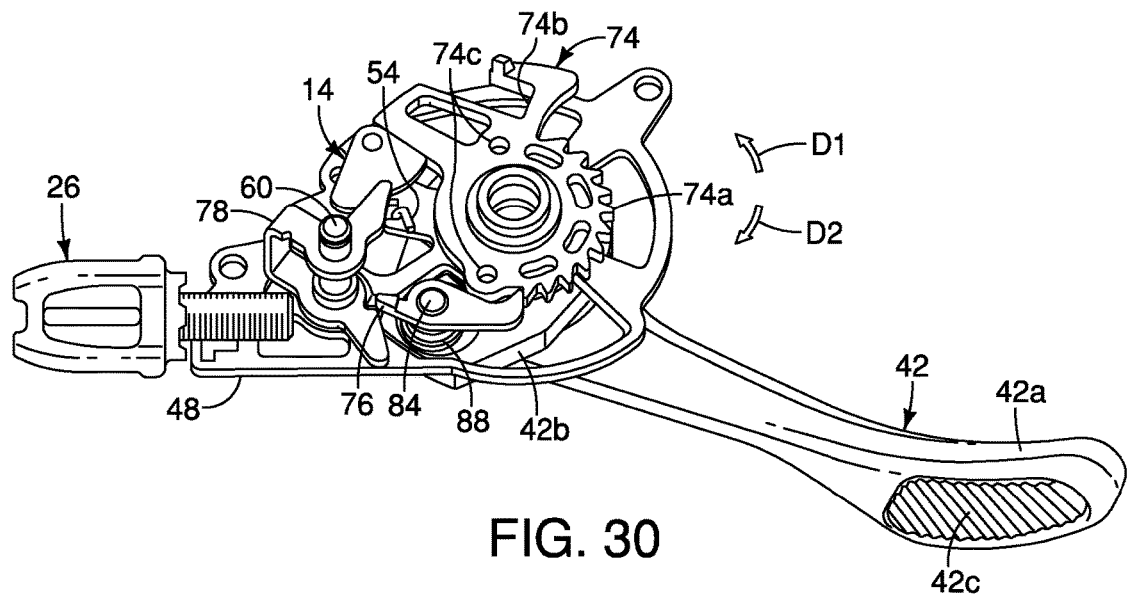
FIG. 30 is a top side perspective view, similar to FIGS. 23 and 26 to 29, of selected parts of the bicycle operating device, but with additional selected parts removed.
Figure 31:
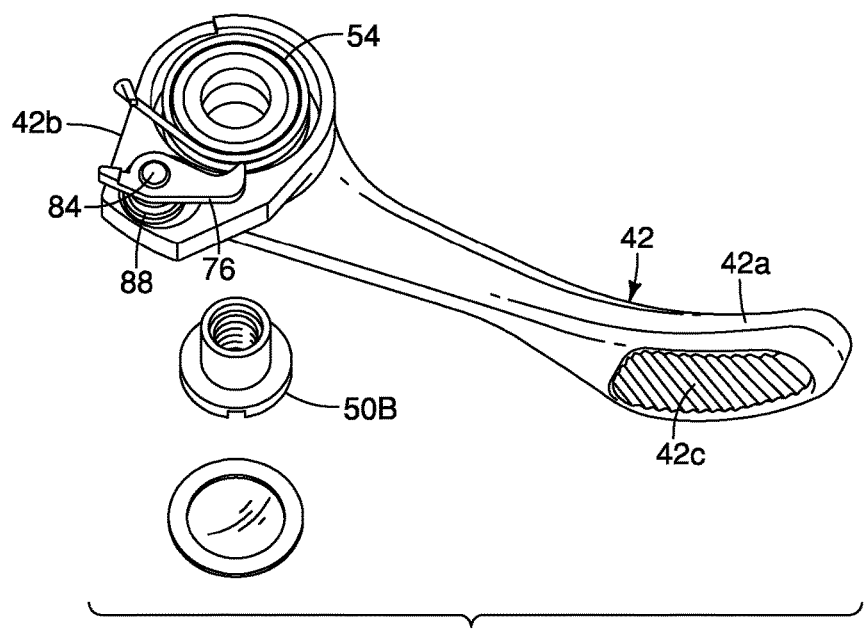
FIG. 31 is a top side perspective view of a mounting nut, a mounting nut cover and the second operating member of the bicycle operating device with a pulling pawl and a return spring mounted on the second operating member.
Figure 32:
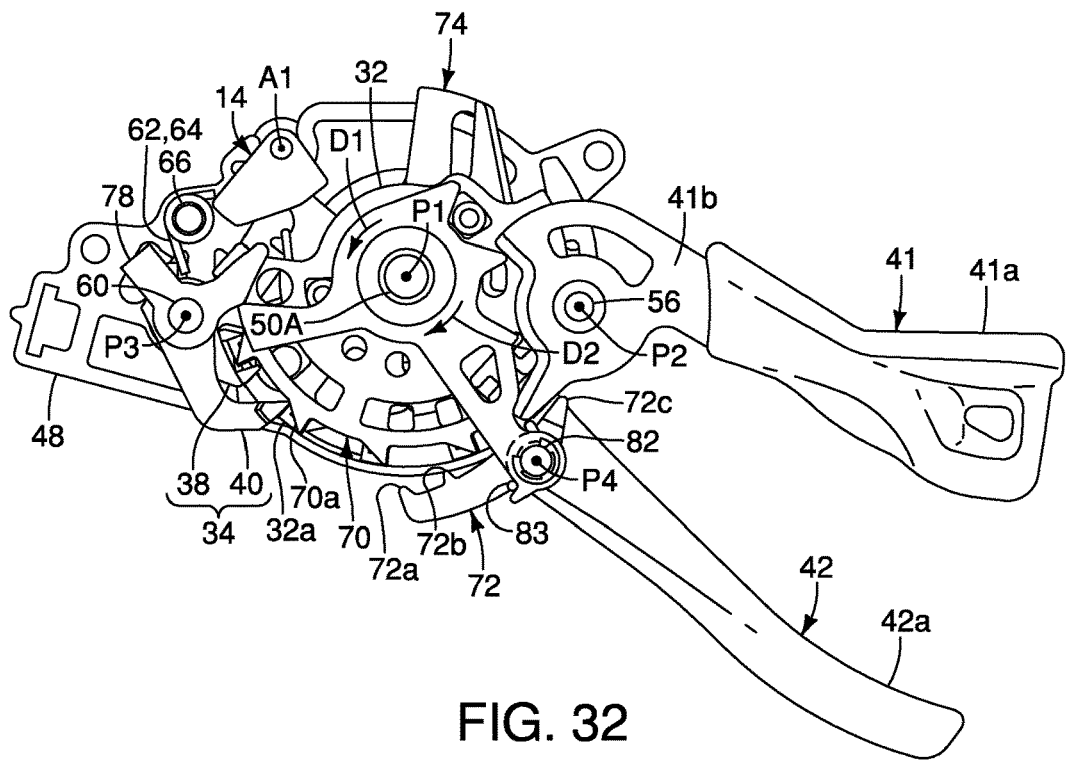
FIG. 32 is a top plan view of selected parts of the bicycle operating device illustrated in FIGS. 1 to 5 in their rest positions and showing the second holding pawl engaging the positioning ratchet to establish the fourth gear position while the restricting member in the non-restricting position.

The first and second operating members 41 and 42 are configured as trigger levers that are biased towards the first and second rest positions, respectively, as shown in FIG. 23. In particular, as seen in FIG. 23, a first biasing element 52 is operatively provided between the first operating member 41 and the top stationary support plate 44 so that the first operating member 41 is return to the rest positions after being operated and released by the user. Similarly, as seen in FIGS. 30 and 31, a second biasing element 54 is operatively provided between the second operating member 42 and the bottom stationary support plate 46 so that the second operating member 42 is return to the rest positions after being operated and released by the user. Thus, as trigger levers, the first and second operating members 41 and 42 automatically return to their rest or home position after being operated and then released by the user.

As explained later, the first operating member 41 can be operated from the first rest position to one of the first actuated positions by pivoting the first operating member 41 in a third direction D3 (as seen in FIG. 3) or a fourth direction D4 (as seen in FIG. 4) about an operating axis P2, while the second operating member 42 can be operated from the second rest position to the second actuated position by pivoting the second operating member 42 in the first direction D1 (as seen in FIG. 5) about the first pivot axis P1.

Figure 22:
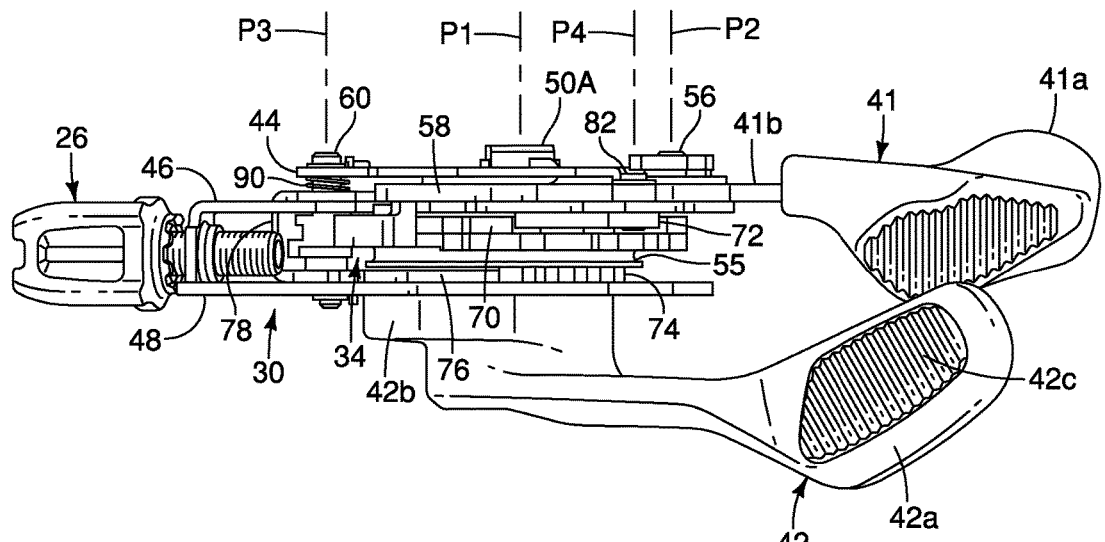
FIG. 22 is a side elevational view of the bicycle operating device illustrated in FIGS. 1 to 5 with the housing remove to reveal the internal parts while the first and second operating members are disposed in the first and second rest positions, respectively.

As seen in FIGS. 22 and 23, this internal support structure includes a first or top stationary support plate 44, a second or middle stationary support plate 46, a third or bottom stationary support plate 48 and a support shaft 50. The stationary support plates 44, 46 and 48 are rigid plates that are made of a suitable material such as, for example, a metallic material. Here, the support shaft 50 includes a bolt 50A (FIG. 23) and a nut 50B (FIG. 31). The bolt 50A of the support shaft 50 has a longitudinal axis that defines a first pivot axis P1. The base member 30 is fixedly coupled to a bicycle part (e.g., the handlebar H in the illustrated embodiment) using the handlebar clamp 18.

Preferably, the user operating part 41a is made of a hard plastic material that is coated with a suitable rubber material along the areas that the user contacts during operation of the first operating member 41. The user operating part 41a includes a first side and a second side opposite to the first side. The first side of the user operating part 41a is contacted by the user during operation of the first operating member 41a in a third direction D3 (as seen in FIG. 3) about an operating axis P2. The second side of the user operating part 41a is contacted by the user during operation of the first operating member 41a in a fourth direction D4 (as seen in FIG. 4) opposite to the third direction D3 about the operating axis P2. The first side of the user operating part 41a is coated with the suitable rubber material, while the second side of the user operating part 41a is not coated with the suitable rubber material. Alternatively, both the first side and the second side of the user operating part 41a can be coated with the suitable rubber material. Alternatively, the user operating part 41a can be made of a suitable rubber material.

In the illustrated embodiment, the bicycle operating device 10 is particularly useful for operating a cable operated bicycle component. Thus, in the first embodiment, the bicycle operating device 10 further comprises a wire takeup member 55 that is arranged to rotate together with the positioning ratchet 32 as the positioning ratchet 32 rotates with respect to the base member 30 about the pivot axis P1. Referring to FIGS. 10, 22 and 26 to 29, the wire takeup member 55 is pivotally mounted on the support shaft 50 to release or pull the inner wire 12b depending on the pivotal direction of the wire takeup member 55. The wire takeup member 55 is biased in the second direction D2. Here, the wire takeup member 55 releases the inner wire 12b from the housing 16 as the wire takeup member 55 pivots in the second direction D2 in response to operation of the first operating member 41. Thus, in the illustrated embodiment, the second direction D2 is a wire releasing direction of the wire takeup member 55. On the other hand, the wire takeup member 55 pulls the inner wire 12b into the housing 16 as the wire takeup member 55 pivots in the first direction D1 in response to operation of the second operating member 42. Thus, in the illustrated embodiment, the first direction D1 is a wire pulling direction of the wire takeup member 55. In the illustrated embodiment, the wire takeup member 55 is a spool that is rotatably mounted on the support shaft 50. The wire takeup member 55 is a rigid part that is made of a suitable material such as, for example, a hard non-metallic material.

Referring to FIGS. 9 and 22, the first operating member 41 is movably attached to the top and middle stationary support plates 44 and 46 by a pivot pin 56. The pivot pin 56 defines the operating axis P2. Here, the pivot pin is a bolt and nut arrangement. As seen in FIGS. 9, 23 and 32 to 37, the bicycle operating device 10 further comprises an internal operating part 58 that is pivotally mounted with respect to the base member 30 about the first pivot axis P1. The first operating member 41 cooperates with the operating part 58 such that the first operating member 41 can be operated by the rider in a third direction D3 or a fourth direction D4 about the operating axis P2. Basically, operation of the first operating member 41 pivots the operating part 58 in the second direction D2 about the first pivot axis P1. Thus, the operating part 58 is movably mounted with respect to the base member 30 between a rest position and an actuated position. Of course, alternatively, the first operating member 41 can be configured such that the first operating member 41 can be pivoted in only one direction to perform a releasing operation. For example, the operating part 58 and the first operating member 41 can be formed as a single piece if it is desirable for the first operating member 41 to be operated only in a single direction.

In both cases, the first biasing element 52 (shown in FIG. 9) functions as a return spring for returning the first operating member 41 and the operating part 58 from their actuated positions back to their rest positions, respectively. As a result, the first operating member 41 is a trigger member that returns to its rest position upon being operated and released. In particular, the first biasing element 52 is a flat coil torsion spring that is coiled about the bolt 50A of the support shaft 50. A first end part of the first biasing element 52 is attached to the operating part 58 (i.e., disposed in an opening of the operating part 58). A second end part of the biasing element 52 is attached to the base member 30 (i.e., hooked onto the top stationary support plate 44). The first operating member 41 has a pair of projections that contact the operating part 58 to maintain the first operating member 41 in the rest position. In this way, the first operating member 41 and the operating part 58 are stationary and held from freely moving while the operating part 58 is urged to the rest position by the biasing force of the first biasing element 52.

Referring to FIGS. 10 to 16, the position maintaining mechanism will now be discussed. The position maintaining mechanism is used for holding the inner wire 12b while the first and second operating members 41 and 42 are in their rest positions. In particular, in the illustrated embodiment, the position maintaining mechanism is mainly formed by the positioning ratchet 32, the first holding pawl 38 and the second holding pawl 40. The first and second holding pawls 38 and 40 alternately contact the positioning abutments 32a to prevent pivoting of the positioning ratchet 32 in the second direction D2 about the pivot axis P1. The positioning ratchet 32 is fixed to the wire takeup member 55 so that the wire takeup member 55 and the positioning ratchet 32 pivot together as a unit about the pivot axis P1. Basically, the positioning ratchet 32 is pivotally mounted with respect to the base member 30 about the first pivot axis P1. Specifically, the positioning ratchet 32 is configured to rotate in the first direction D1 and the second direction D2. More specifically, the positioning ratchet 32 is pivotally mounted on the bolt 50A of the support shaft 50.

The first operating member 41 is operatively coupled to the positioning ratchet 32 to pivot the positioning ratchet 32 with respect to the base member 30 in the second direction D2 as the first operating member 41 moves from the first rest position to one of the first actuated positions. On the other hand, the second operating member 42 is operatively coupled to the positioning ratchet 32 to pivot the positioning ratchet 32 with respect to the base member 30 in the first direction D1 as the second operating member 42 moves from the second rest position to the second actuated position.

Generally, the bicycle operating device 10 comprises the holding member 34 for selectively holding the positioning ratchet 32 and the wire takeup member 55 in the plurality of gear positions. In the illustrated embodiment, a mentioned above, the holding member 34 includes the first holding pawl 38 and the second holding pawl 40. However, the holding member 34 can be a single positioning pawl if needed and/or desired. Here, the holding member 34 is movably mounted with respect to the base member 30 between a holding position and a releasing position as seen in FIGS. 32 to 34, 36 and 37. Specifically, the first and second holding pawls 38 and 40 are each pivotally mounted with respect to the base member 30 about a third pivot axis P3 between a holding position and a releasing position. More specifically, the operating part 58 is operatively coupled to the first and second holding pawls 38 and 40 to selectively move the first and second holding pawls 38 and 40 from the holding position to the releasing position as the operating part 58 moves from the rest position to the actuated position. In the illustrated embodiment, the first operating member 41 pivots the operating part 58 to selectively move the first and second holding pawls 38 and 40 from the holding position to the releasing position as the operating part 58 moves from the rest position to the actuated position. Basically, the first and second holding pawls 38 and 40 prevent pivoting of the positioning ratchet 32 in the second direction D2 about the first pivot axis P1 while one of the first and second holding pawls 38 and 40 is in the holding position, while the other one of the first and second holding pawls 38 and 40 is in a ready position. The first and second holding pawls 38 and 40 releases the positioning ratchet 32 to pivot in the second direction D2 when one of the first and second holding pawls 38 and 40 is moved from the holding position to the releasing position. Upon one of the first and second holding pawls 38 and 40 being moved from the holding position to the releasing position, the other one of the first and second holding pawls 38 and 40 is in the ready position to engage the positioning ratchet 32 and stop rotation of the positioning ratchet 32. Now, the other one of the first and second holding pawls 38 and 40 switch from the ready position to the holding position.

Here, in the illustrated embodiment, the first holding pawl 38 is movably mounted with respect to the base member 30 between a first holding position and a first releasing position. Similarly, the second holding pawl 40 is movably mounted with respect to the base member 30 between a second holding position and a second releasing position. Specifically, the first holding pawl 38 is pivotally mounted with respect to the base member 30 about a pawl pivot axis (i.e., the third pivot axis P3) between the first holding position and the first releasing position. The second holding pawl 40 is pivotally mounted with respect to the base member 30 about the third (pawl) pivot axis P3 between the second holding position and the second releasing position. The first operating member 41 selectively moves the first and second holding pawls 38 and 40 from the first and second holding positions to the first and second releasing positions, respectively, as the first operating member 41 moves from the first rest position to the first actuated position. In this way, the first and second holding pawls 38 and 40 selectively hold and release the positioning ratchet 32. Basically, only one of first and second holding pawls 38 and 40 engages one of the positioning abutments 32a at any given time. More particularly, the first and second holding pawls 38 and 40 alternately move between engagement with one of the positioning abutments 32a of the positioning ratchet 32 as the positioning ratchet 32 moves from one of the predetermined positions to the next one of the predetermined positions. As best seen in FIGS. 32 to 34, 36 and 37, the first holding pawl 38 and the second holding pawl 40 are configured to move independently from each other. In the illustrated embodiment, the bicycle operating device 10 further comprises a pivot pin 60 that pivotally supports the first holding pawl 38 and the second holding pawl 40.

Referring to FIGS. 22 to 25, the bicycle operating device 10 further comprises a first biasing member 62 for biasing the first holding pawl 38 toward the first holding position, and a second biasing member 64 for biasing the second holding pawl 40 toward the second holding position. The bicycle operating device 10 further comprises a pin 66 that supports the first and second biasing members 62 and 64 in the illustrated embodiment. The first biasing member 62 biases the first holding pawl 38 toward the first holding position. In other words, the first biasing member 62 biases the first holding pawl 38 towards a peripheral edge of the positioning ratchet 32 into engagement with one of the positioning abutments 32a of the positioning ratchet 32. The second biasing member 64 biases the second holding pawl 40 toward the second holding position. In other words, the second biasing member 64 biases the second holding pawl 40 towards the peripheral edge of the positioning ratchet 32 into engagement with one of the positioning abutments 32a of the positioning ratchet 32.

The first and second biasing members 62 and 64 are coil torsion springs that are coiled about the pin 66. The first biasing member 62 has one end engaged with (i.e., hooked onto) the bottom stationary support plate 46 and the other end engaged with (i.e., contacting) the first holding pawl 38. On the other hand, the second biasing member 64 has one end engaged with (i.e., hooked onto) the middle stationary support plate 46 and the other end engaged with (i.e., contacting) the second holding pawl 40. However, the first and second biasing members 62 and 64 can be formed a single biasing member that biases both of the first and second holding pawls 38 and 40 towards engagement with the positioning ratchet 32.

As seen in FIGS. 11, 15 and 16, the first holding pawl 38 prevents pivoting of the positioning ratchet 32 in the second direction D2 about the first pivot axis P1 while the first holding pawl 38 is in the first holding position. As seen in FIG. 16, the first holding pawl 38 releases the positioning ratchet 32 to pivot in the second direction D2 while the first holding pawl 38 is in the first releasing position until the positioning ratchet 32 contacts the second holding pawl 40. Similarly, as seen in FIGS. 13 and 16, the second holding pawl 40 prevents pivoting of the positioning ratchet 32 in the second direction D2 about the first pivot axis P1 while the second holding pawl 40 is in the second holding position. As seen in FIG. 16, the second holding pawl 40 releases the positioning ratchet 32 to pivot in the second direction D2 while the second holding pawl 40 is in the first releasing position until the positioning ratchet 32 contacts the first holding pawl 38.

Figure 38:
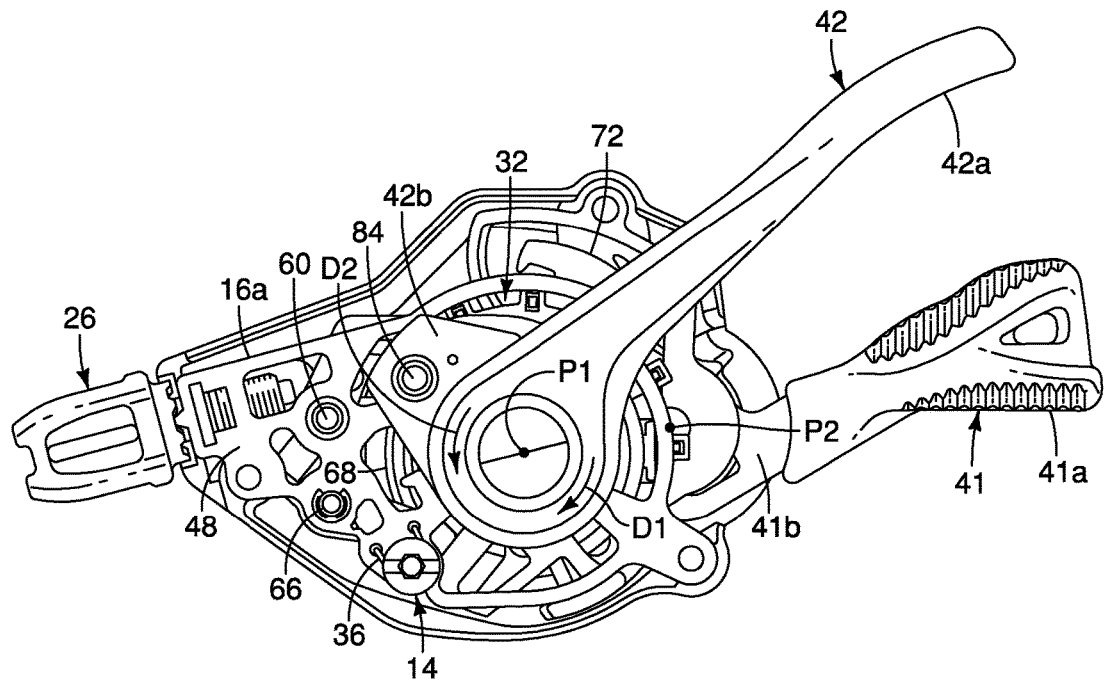
FIG. 38 is a bottom plan view of the selected parts of the bicycle operating device illustrated in FIG. 24.
Figure 39:
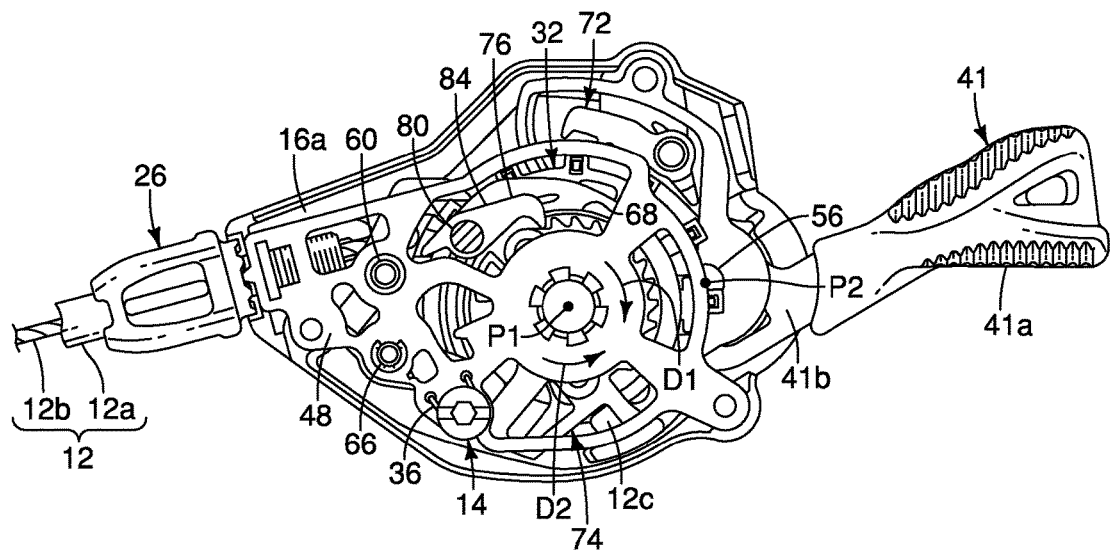
FIG. 39 is a bottom plan view, similar to FIG. 26, of the bicycle operating device illustrated in FIGS. 1 to 5 with additional parts removed.

Preferably, as seen in FIGS. 38 and 39, the bicycle operating device 10 further comprises a biasing element 68 that is provided for biasing the wire takeup member 55 and the positioning ratchet 32 in the second direction D2 (the wire releasing direction) with respect to the housing 16. As explained above, the positioning ratchet 32 pivots with the wire takeup member 55. Thus, the positioning ratchet 32 selectively cooperates with the first and second holding pawls 38 and 40 to maintain the wire takeup member 55 in one of a plurality of predetermined gear positions against the biasing force of the biasing element 68. In other words, to establish the predetermined positions, the positioning abutments 32*a* of the positioning ratchet 32 are selectively engaged by the first and second holding pawls 38 and 40 to hold the wire takeup member 55 and the positioning ratchet 32 from rotating under the biasing force of the biasing element 68.

In the illustrated embodiment, the biasing element 68 is a flat coil torsion spring that is coiled about the bolt 50A of the support shaft 50. Alternatively, the biasing element 68 can be eliminated and the wire takeup member 55 can be biased in the second direction D2 by a spring of the bicycle component that is operated by the bicycle operating device 10. Basically, operation of the first operating member 41 releases the wire takeup member 55 such that the biasing element 68 (i.e., a torsion spring) pivots the wire takeup member 55 in the second direction D2 as the first operating member 41 is moved by the user from the first rest position to one of the first actuated position.

Figure 28:
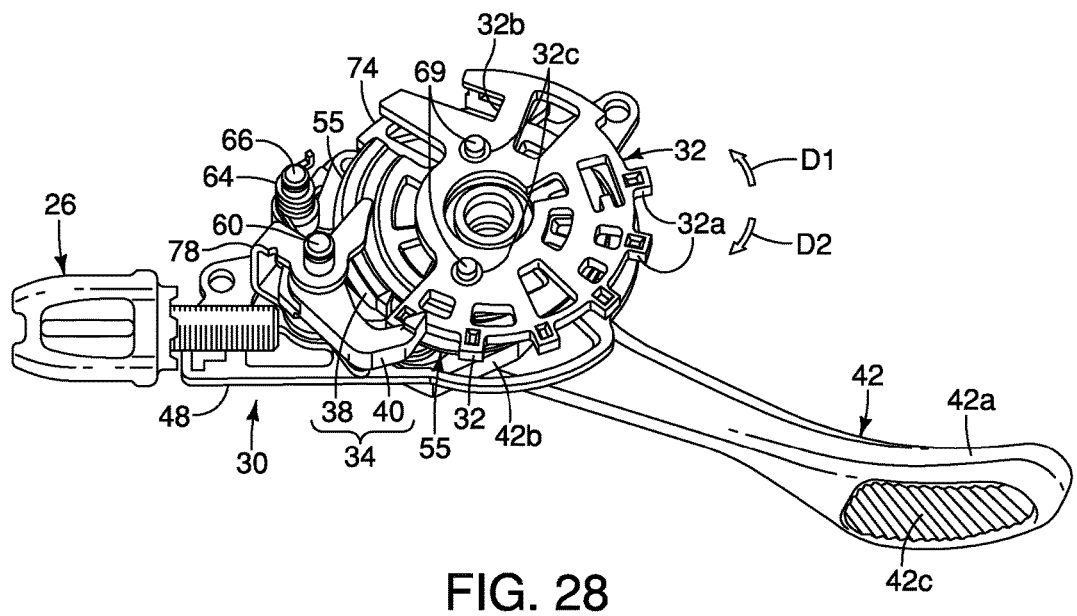
FIG. 28 is a top side perspective view, similar to FIGS. 23, 26 and 27, of selected parts of the bicycle operating device, but with additional selected parts removed.
Figure 29:
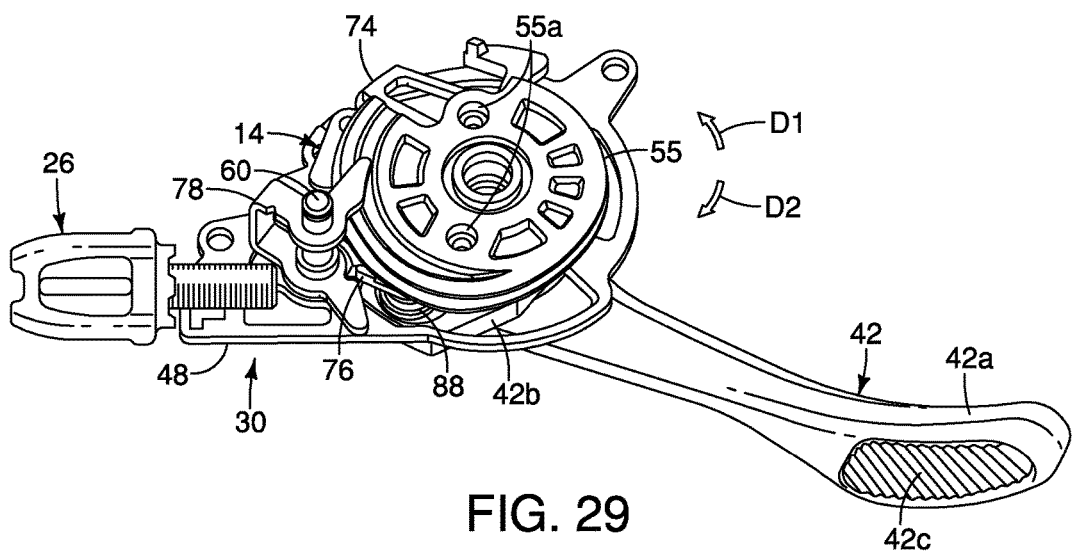
FIG. 29 is a top side perspective view, similar to FIGS. 23 and 26 to 28, of selected parts of the bicycle operating device, but with additional selected parts removed.

Here, referring to FIGS. 28 and 29, the wire takeup member 55 is non-movably coupled to the positioning ratchet 32 by a pair of fixing pins 69. In particular, the fixing pins 69 are disposed in two bores 55*a* of the wire takeup member 55 and in two bores 32*b* of the positioning ratchet 32 to prevent relative movement between the wire takeup member 55 and the positioning ratchet 32 around the first pivot axis P1. In this way, the wire takeup member 55 is arranged to pivot together with the positioning ratchet 32 as the positioning ratchet 32 pivots with respect to the base member 30 about the first pivot axis P1. In other words, the positioning ratchet 32 is configured to pivot with the wire takeup member 55 between the plurality of predetermined positions, which are established by selective engagement of one of the first and second holding pawls 38 and 40 with the positioning ratchet 32. The positioning ratchet 32 also includes a cable nipple attachment portion 32*c* for receiving the cable nipple 12*c* (see FIG. 10). Thus, the positioning ratchet 32, the first holding pawl 38 and the second holding pawl 40 basically form the cable position maintaining mechanism of the bicycle operating device 10.

Figure 33:
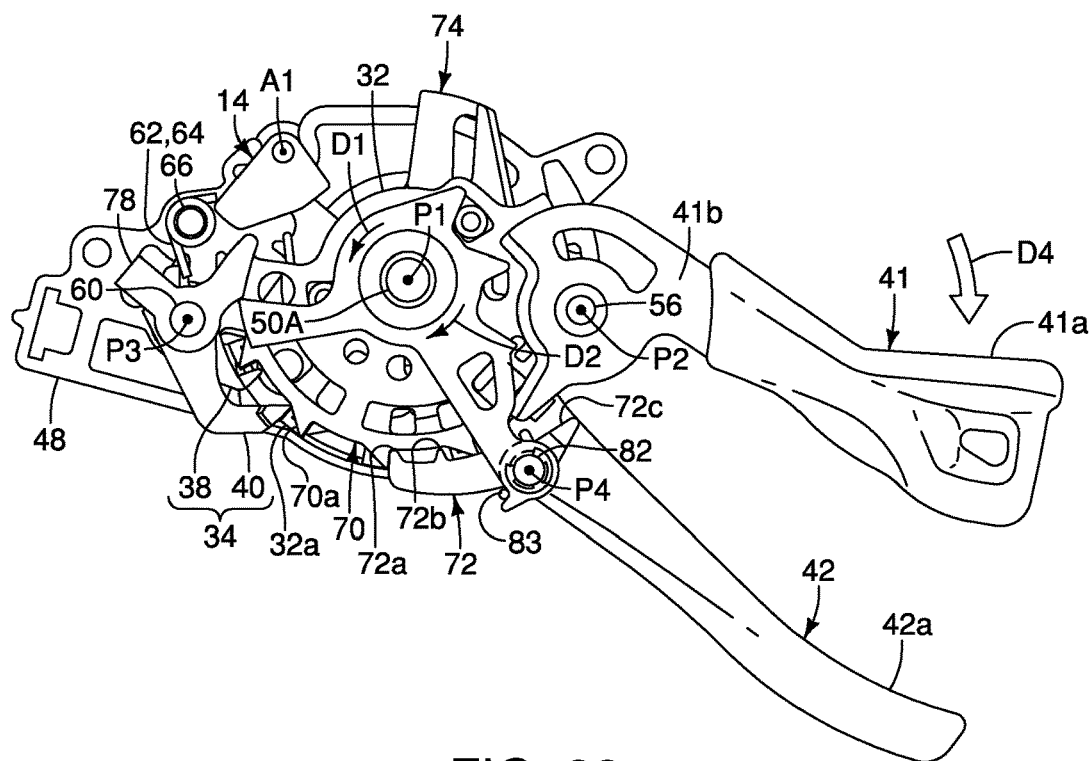
FIG. 33 is a top plan view of the selected parts of the bicycle operating device shown in FIG. 32, but with the first operating member being moved to start a releasing operation such that the release pawl is moved into engagement with the release member.
Figure 34:
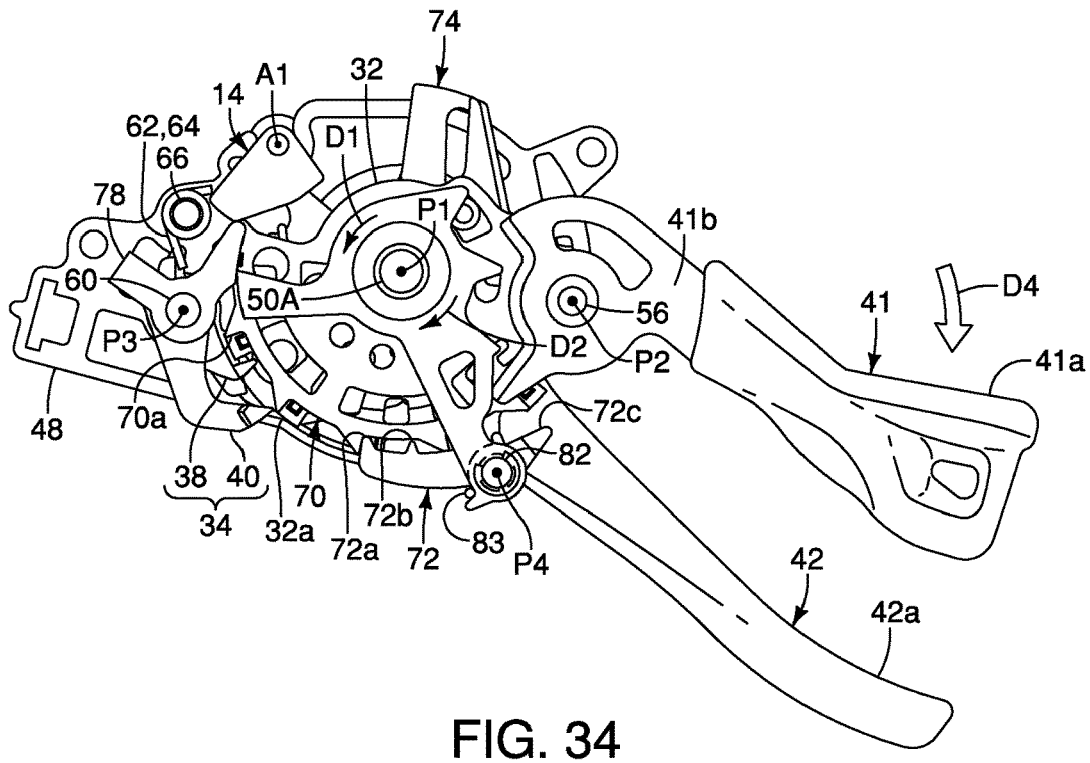
FIG. 34 is a top plan view of the selected parts of the bicycle operating device shown in FIGS. 32 and 33, but with the first operating member being moved further in the releasing operation from the position shown in FIG. 33 such that a release element moves a pulling pawl away from a pulling member.
Figure 35:
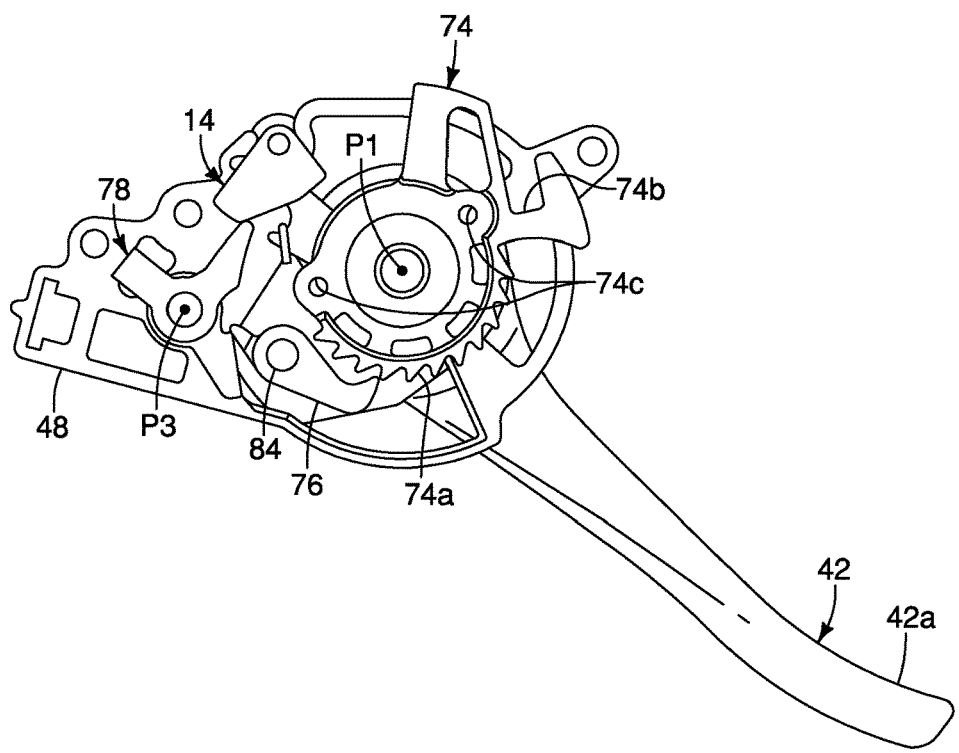
FIG. 35 is a top plan view of selected parts of the bicycle operating device with the first operating member in the partially actuated position of FIG. 34 showing the pulling pawl moved away from the pulling member by the release element.
Figure 36:
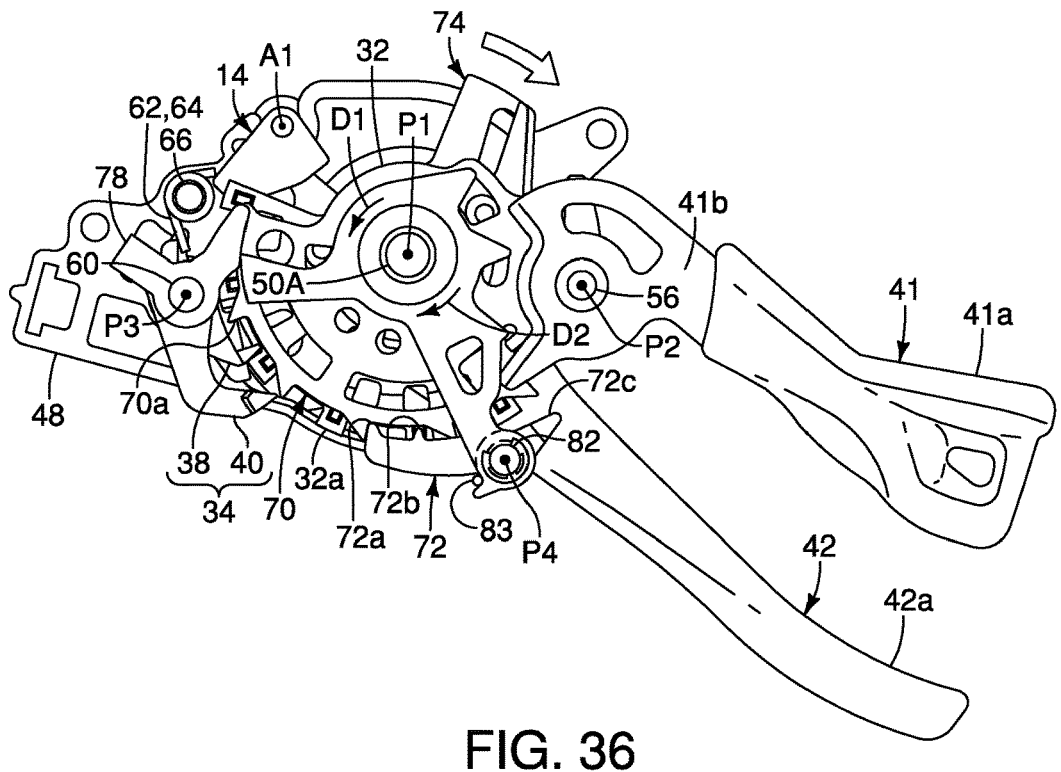
FIG. 36 is a top plan view of the selected parts of the bicycle operating device shown in FIGS. 32 to 34, but with the first operating member being moved further in the releasing operation from the position shown in FIGS. 34 and 35 such that the release element moves the second holding pawl out of engagement from the positioning ratchet to release the positioning ratchet to engage the first holding pawl for establishing the third gear position.
Figure 37:
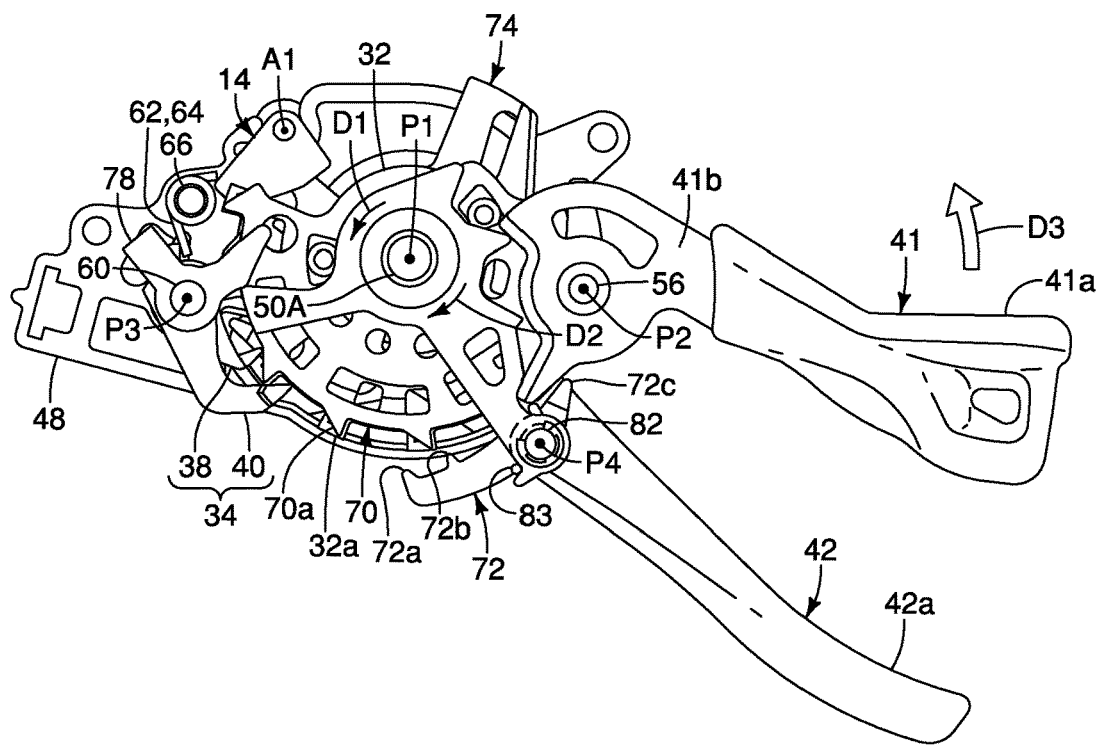
FIG. 37 is a top plan view of the selected parts of the bicycle operating device shown in FIGS. 32 to 34 and 36, but the first operating member being returned to the rest position after the releasing operation shown in FIGS. 33 to 36.

Referring FIGS. 32 to 37, to release the positioning ratchet 32 and the wire takeup member 55 for pivoting on the bolt 50A of the support shaft 50 in the second direction D2, the bicycle operating device 10 further comprises a release member 70 and a release pawl 72. On the other hand, referring FIGS. 40 to 42, to pivot the positioning ratchet 32 and the wire takeup member 55 in the first direction D1, the bicycle operating device 10 further comprises a pulling member 74 and a pulling pawl 76. The bicycle operating device 10 further comprises a second release element 78. The release element 78 is arranged to move the pulling pawl 76 away from the pulling member 74 during a releasing operation as seen in FIG. 35.

The release member 70 is basically a rigid plate that is made of a suitable material such as, for example, a metallic material. The positioning ratchet 32 is positioned between the pulling member 74 and the release member 70 along the first pivot axis P1. The release member 70 is movably mounted with respect to the base member 30. Basically, the release member 70 selectively moves the holding member 34 from the holding position to the releasing position as the release member 70 moves with respect to the base member 30. More specifically, the release member 70 is movably mounted to selectively cooperate with the first and second holding pawls 38 and 40 of the holding member 34 to release the wire takeup member 55 for rotational movement in the second direction D2 about the first pivot axis P1.

The release member 70 includes a plurality of release teeth 70*a*. Thus, the release member 70 constitutes a release ratchet. The release teeth 70*a* are selectively engaged by the release pawl 72 to move the release member 70 in the first direction D1 as the first operating member 41 moves from the first rest position to one of the first actuated positions. As a result, the release member 70 is movably mounted with respect to the base member 30. The release member 70 moves the holding member 34 from the holding position to the releasing position as the release member 70 moves with respect to the base member 30. Specifically, the release member 70 selectively moves the first and second holding pawls 38 and 40 from the first and second holding positions to the first and second releasing positions, respectively, as the release member 70 moves with respect to the base member 30.

Figure 27:
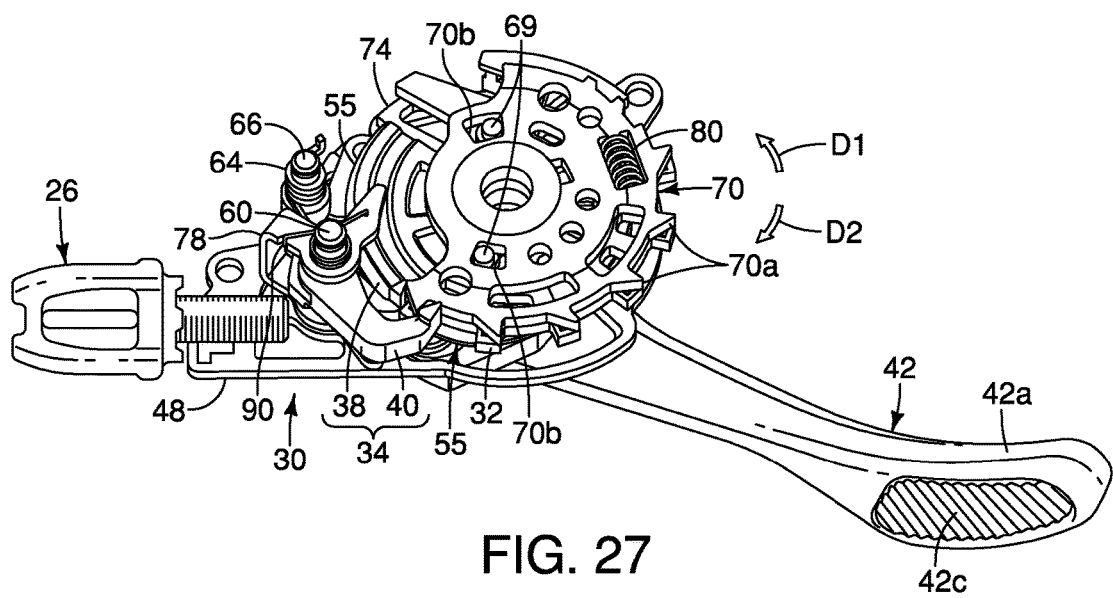
FIG. 27 is a top side perspective view, similar to FIGS. 23 and 26, of selected parts of the bicycle operating device, but with additional selected parts removed.

Referring to FIGS. 27, 33 and 34, the release member 70 is basically coupled to the positioning ratchet 32 with a small amount of rotational play between the release member 70 and the positioning ratchet 32. Since the positioning ratchet 32 is fixed to the wire takeup member 55, the release member 70 is movably coupled to the positioning ratchet 32 to move in the second direction D2 within a prescribed range relative to the positioning ratchet 32 between a non-release position (FIG. 33) and a release position (FIG. 34). The release member 70 alternatively holds one of the first and second holding pawls 38 and 40 out of engagement with the positioning abutments 32*a* of the positioning ratchet 32 while the release member 70 is in the release position.

Referring to FIG. 27, a biasing member 80 is disposed between the release member 70 and the positioning ratchet 32 for biasing the release member 70 to the non-release position. In the illustrated embodiment, the biasing member 80 is a compression spring that is disposed in an opening of the positioning ratchet 32 and an opening of the first release member 56. The release member 70 alternately moves the first holding pawl 38 towards the first releasing position and moves the second holding pawl 40 towards the second releasing position as the release member 70 moves in the second direction D2.

Referring to FIG. 27, the release member 70 has a pair of arc-shaped openings 70*b* that mates with an upper end of the fixing pins 69. The arc-shaped openings are configured so that the release member 70 can pivot relative to the wire takeup member 55 within a prescribed range during a releasing operation of the first operating member 41 as mentioned above. Due to the biasing member 80 biasing the release member 70 to the non-release position, the release member 70 is configured to move in the first direction D1 in response to a rotation of the wire takeup member 55 in the first direction D1 as a result of the operation of the second operating member 42.

As seen in FIGS. 32 to 34, 36 and 37, the release pawl 72 is movably mounted with respect to the base member 30. The release pawl 72 is operatively coupled to the first operating member 41, and arranged to move the release member 70 from the holding position to the releasing position as the first operating member 41 moves from the first rest position to the first actuated position. Specifically, the release pawl 72 is operatively coupled to the first operating member 41 via the operating part 58 for carrying out the releasing operation as explained below. In the illustrated embodiment, the first operating member 41 pivots the operating part 58 to selectively move the release pawl 72 as the operating part 58 moves from the rest position to the actuated position. The release pawl 72 then pivots the release member 70 about a release pivot axis P4. Thus, the operating part 58 moves the release pawl 72 as the operating part 58 moves from the rest position and the actuated position. In this way, the operating part 58 is configured to move the release pawl 72 as the operating part 58 moves with respect to the base member 30. As a result, the release pawl 72 moves the release member 70 as the first release pawl 72 moves with respect to the base member 30.

In the illustrated embodiment, as seen in FIG. 10, the release pawl 72 includes a first pawl part 72a and a second pawl part 72b. The first and second pawl parts 72a and 72b are configured to selectively contact with the release member 70 as the release pawl 72 moves with respect to the base member 30. The release pawl 72 is pivotally mounted on the operating part 58 with respect to the operating part 58 about a release pivot axis P4. In the illustrated embodiment, the release pawl 72 is pivotally mounted on the operating part 58 by a pivot pin 82 that defines the release pivot axis P4 which is parallel to the first pivot axis P1, the third pivot axis P3 and the operating axis P2. Basically, the release pawl 72 is configured to move the release member 70 from the holding position to the releasing position as the first operating member 41 moves from the first rest position to the first actuated position.

Preferably, as in the illustrated embodiment, the release pawl 72 is biased by a biasing element 83 (e.g., a coil torsion spring) radially towards the first pivot axis P1. Thus, the release pawl 72 is biased by the biasing element 83 so as to engage with the release teeth 70a upon movement of the first operating member 41 from the first rest position to the first actuated position. However, the release pawl 72 is held disengaged from the release teeth 70a while the first operating member 41 is in the first rest position. In particular, an abutment 72c of the release pawl 72 is pushed against the middle stationary support plate 46 by the biasing force of the first biasing element 52 so as to pivot the release pawl 72 outwardly from the release teeth 70a while the first operating member 41 is in the first rest position. In other words, the abutment 72c (FIG. 10) of the release pawl 72 is forced into contact with the middle stationary support plate 46 by the biasing force of the first biasing element 52 acting on the operating part 58. According to this contact, while the first operating member 41 is in the first rest position, the release pawl 72 is pivoted outwardly on the pivot pin 82 away from the release member 70.

Here, the second pawl part 72b is circumferentially spaced from the first pawl part 72a with respect to the first pivot axis P1. Thus, the first pawl part 72a and the second pawl part 72b are different from each other. The release member 70 moves the first holding pawl 38 from the first holding position to the first releasing position while the first pawl part 72a contacts the release member 70 and the release pawl 72 moves the release member 70 from the holding position to the releasing position. The release member 70 moves the second holding pawl 40 from the second holding position to the second releasing position while the second pawl part 72b contacts the release member 70 and the release pawl 72 moves the release member 70 from the holding position to the releasing position.

One of the release teeth 70a is configured to contact with the first pawl part 72a of the release pawl 72 and the second pawl part 72b of the release pawl 72. The one of the release teeth 70a being configured to contact with the first holding pawl 38 and the second holding pawl 40.

Figure 40:
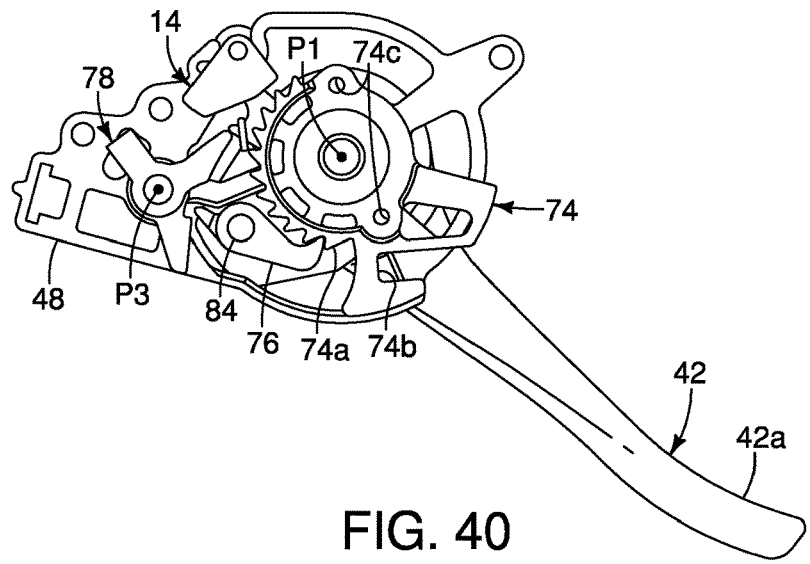
FIG. 40 is a top plan view of selected parts of the bicycle operating device illustrated in FIGS. 1 to 5 in their rest positions and showing the bicycle operating device in the twelfth gear position with the restricting member in the non-restricting position.
Figure 41:
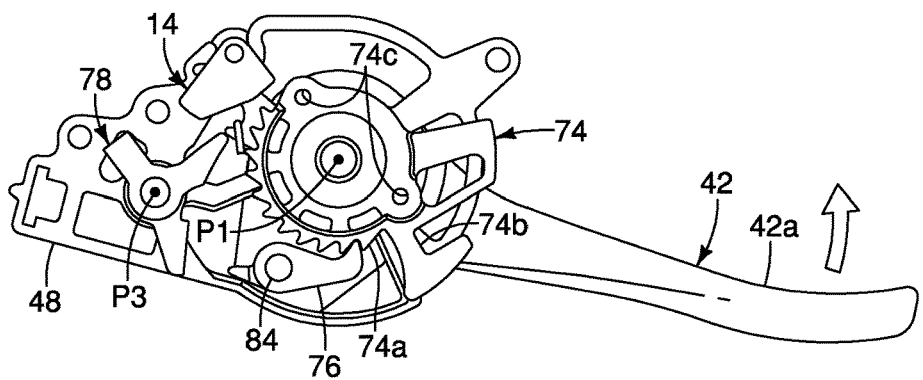
FIG. 41 is a top plan view of the selected parts of the bicycle operating device shown in FIG. 40, but with the second operating member being moved to start a pulling operation such that the pulling pawl rotates the pulling member two gear positions in a single progressive movement of the second operating member from the rest position to an actuated position without returning to the rest position.
Figure 42:
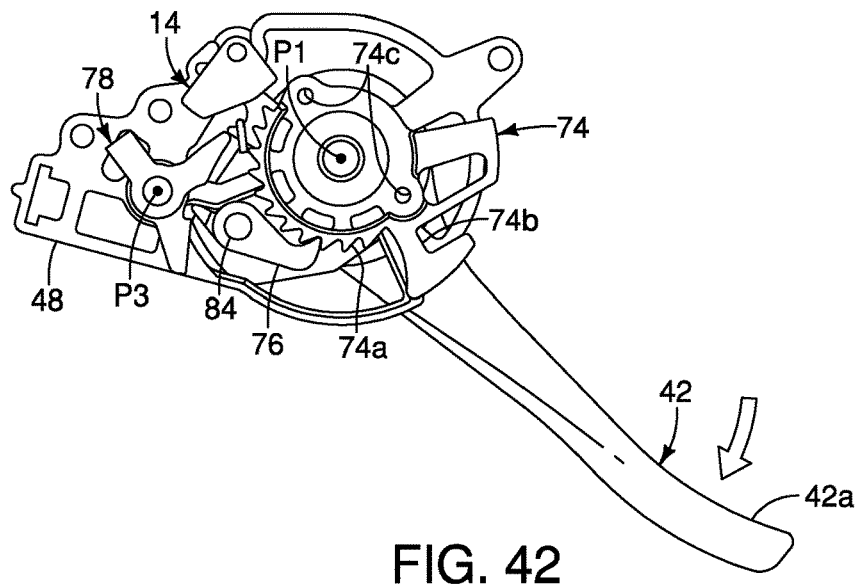
FIG. 42 is a top plan view of the selected parts of the bicycle operating device shown in FIGS. 40 and 41, but with the second operating member returned to the rest position after the pulling operation shown in FIG. 42.

Now, the pulling member 74 and the pulling pawl 76 will now be discussed for performing a wire pulling operation, which is shown in FIGS. 40 to 42. First, referring to FIGS. 10, 12 and 14, the pulling member 74 is movably mounted with respect to the base member 30. Specifically, the pulling member 74 is pivotally mounted on the bolt 50A of the support shaft 50 to pivot with respect to the base member 30. As seen in FIGS. 11, 13 and 15, the pulling pawl 76 is movably mounted on the second operating member 42. In particular, the second operating member 42 movably supports the pulling pawl 76 to pull the inner wire 12b into the housing 16 by pivoting the pulling member 74. The pulling member 74 moves the positioning ratchet 32 in the first direction D1 as the pulling member 74 moves with respect to the base member 30. In particular, the pulling member 74 pivots the positioning ratchet 32 in the first direction D1 as the pulling member 74 is moved by the pulling pawl 76 in response to operation of the second operating member 42.

The pulling member 74 includes a plurality of pulling teeth 74a that are selectively engaged by the pulling pawl 76. Thus, the pulling member 74 constitutes a pulling ratchet. The pulling pawl 76 contacts the pulling member 74 and moves the pulling member 74 as the second operating member 42 moves from the second rest position to the second actuated position. The pulling member 74 also includes a cable nipple attachment portion 74b for receiving the cable nipple. During operation of the second operating member 42, the pulling pawl 76 engages the pulling teeth 74a and pivots the positioning ratchet 32 and the wire takeup member 55 in the first direction D1 (the wire pulling direction) as the second operating member 42 moves from the second rest position to the second actuated position. In particular, the pulling member 74 is fixed to the positioning ratchet 32 by the fixing pins 69 which extend into a pair of bores 74c of the pulling member 74 (see FIGS. 11 and 28 to 30). As a result, the positioning ratchet 32 and the pulling member 74 move together as unit about the first pivot axis P1.

Since the pulling member 74 is attached to the positioning ratchet 32, the biasing element 68 biases the wire takeup member 55, the positioning ratchet 32 and the pulling member 74 in the second direction D2. A first end part of the biasing element 68 is attached to the bottom stationary support plate 46 (i.e., hooked onto a portion of the bottom stationary support plate 46 in the case of the illustrated embodiment). A second end part of the biasing element 68 is operatively coupled to the wire takeup member 55 (i.e., disposed in a hole of the pulling member 74, which is non-movably attached to the bottom of the wire takeup member 55 in the case of the illustrated embodiment).

As seen in FIG. 31, the pulling pawl 76 is pivotally mounted on the second operating member 42 by a pivot pin 84 that is mounted to the second operating member 42. The bicycle operating device 10 further comprises a biasing element 88. The biasing element 88 biases the pulling pawl 76 toward engagement with the pulling member 74. Here, the biasing element 88 is a coil torsion spring that is mounted on the pivot pin 84 and biases the pulling pawl 76 radially towards the first pivot axis P1. The pulling pawl 76 is biased to engage one of the pulling teeth 74a of the pulling member 74 while the first and second operating members 41 and 42 are in the first and second rest positions, respectively, as seen in FIG. 30. However, the pulling pawl 76 can be biased to contact and held on the release element 78 between a pair of the pulling teeth 74a of the pulling member 74 while the first and second operating members 41 and 42 are in the first and second rest positions, respectively. The pulling pawl 76 is disengaged from the pulling teeth 74a of the pulling member 74 as the first operating member 41 moves from the first rest position toward the first actuated position as seen in FIG. 35 and as explained below.

As the second operating member 42 is pivoted in the first direction D1 to perform a pulling operation of the inner wire 12b, the pulling pawl 76 is moved into contact with the pulling member 74 to pivot the pulling member 74 and the positioning ratchet 32 with respect to the base member 30 in the first direction D1 as the second operating member 42 moves from the second rest position to the second actuated position. In other words, the pulling pawl 76 contacts the pulling member 74 and moves the pulling member 74 as the second operating member 42 moves from the second rest position to the second actuated position. In this way, the pulling pawl 76 contacts the pulling member 74 and moves the pulling member 74 as the pulling pawl 76 moves with respect to the base member 30. Thus, as the second operating member 42 performs a pulling operation of the inner wire 12b, the pulling pawl 76 will pivot the pulling member 74 in the first direction D1. As a result, the positioning ratchet 32 and the wire takeup member 55 move together in the first direction D1 as the second operating member 42 moves from the second rest position (e.g., see FIGS. 40 and 42) to the second actuated position (e.g., see FIG. 41).

However, when the first operating member 41 is moved to one of the first actuated positions, the release element 78 will move the pulling pawl 76 out of engagement with the pulling teeth 74a of the pulling member 74. In particular, the pulling pawl 76 is pivoted outwardly on the pivot pin 84 by the release element 78 during operation of the first operating member 41 so that the pulling pawl 76 does not interfere with the releasing operation.

Now referring to FIGS. 32 to 34, 36 and 37, the release element 78 will now be discussed for moving the pulling pawl 76 out of engagement from the pulling teeth 74a of the pulling member 74 so that the pulling pawl 76 does not interfere with the releasing operation. Basically, the release element 78 is movably mounted with respect to the base member 30. More specifically, the release element 78 is pivotally mounted with respect to the base member 30 about the third pivot axis P3. In other words, the release element 78 is pivotally supported on the pivot pin 60, which also supports the holding member 34. In the illustrated embodiment, the release element 78 is pivotally supported on the pivot pin 60, which also supports the first and second holding pawls 38 and 40. The operating part 58 moves the release element 78 which in turn moves the pulling pawl 76 away from the pulling member 74 as the operating part 58 moves from the first rest position and one of the first actuated positions. In other words, the release element 78 moves the pulling pawl 76 away from the pulling member 74 as the release element 78 moves with respect to the base member 30.

The bicycle operating device 10 further comprises a biasing element 90 that is provided for biasing the release element 78 towards the first pivot axis P1. The biasing element 78 is a torsion spring that is coiled about the pivot pin 60. A first end part of the biasing element 78 is attached to (i.e., hooked onto) the second release element 78, while a second end part of the biasing element 78 is attached to (i.e., hooked onto) the top stationary support plate 44.

As seen in FIG. 35, the release element 78 is configured to contact the operating part 58. In this way, operation of the first operating member 41 pivots the operating part 58 which in turn pivots the release element 78. The release element 78 is configured to contact the pulling pawl 76. In other words, the release element 78 moves the pulling pawl 76 out of engagement with the pulling teeth 74a as the release member 70 moves by movement of the first operating member 41 from the first rest position to the first actuated position. Thus, with this arrangement, the pulling pawl 76 is held in a disengaged position from the pulling teeth 74a while the first operating member 41 is in the first actuated position. In other words, while the first operating member 41 is in the first actuated position, the pulling pawl 76 is pivoted outwardly on the pivot pin 84 during operation of the first operating member 41 so that the pulling pawl 76 does not interfere with the releasing operation of the wire takeup member 55.

Figure 43:
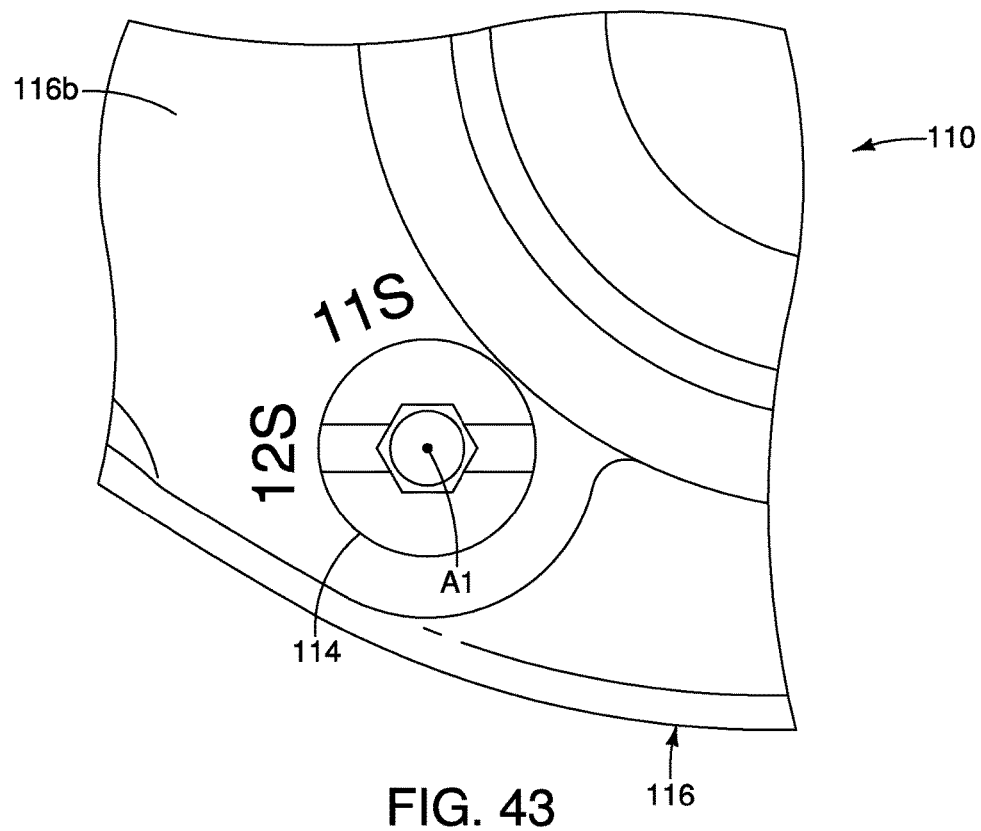
FIG. 43 is a partial bottom plan view of a bicycle operating device in accordance with a second embodiment.
Figures 44, 45:
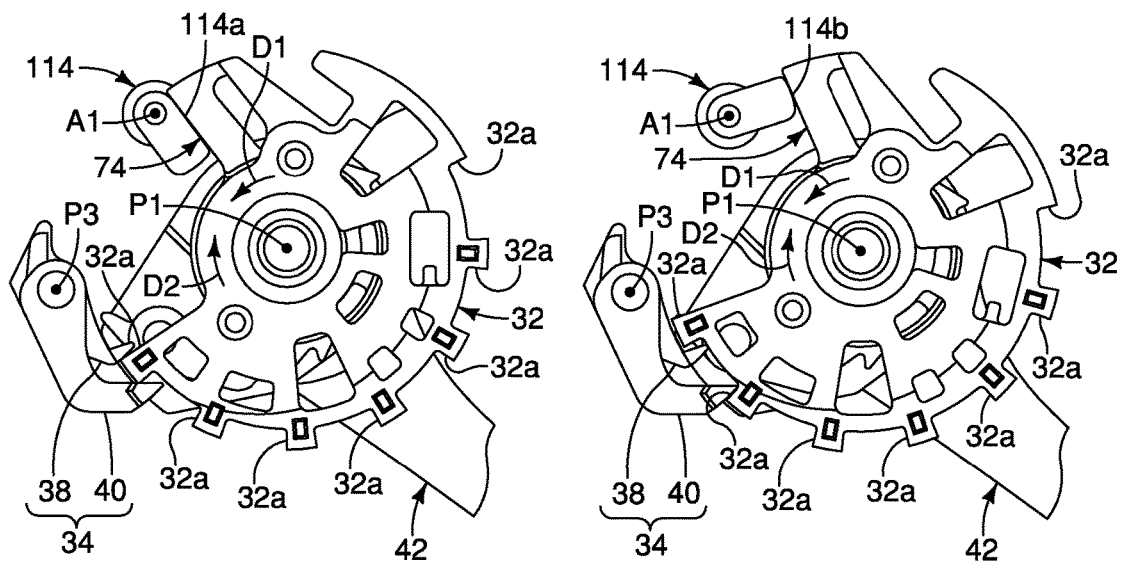
FIG. 44 is a top plan view of selected parts of the bicycle operating device illustrated in FIG. 43 in their rest positions and showing the restricting member in a non-restricting position.
FIG. 45 is a top plan view of the selected parts of the bicycle operating device illustrated in FIG. 44 but showing the restricting member in a restricting position.

Referring now to FIGS. 43 to 45, a bicycle operating device 110 will be discussed in accordance with a second embodiment. Here, the bicycle operating device 110 is identical to the bicycle operating device 10, except that the restricting member 14 and the housing 16b of the bicycle operating device 10 have been replaced with a restricting member 114 and a housing 116b. The remaining parts of the bicycle operating device 110 are identical to the corresponding parts of the bicycle operating device 10. Thus, the parts of the bicycle operating device 110 that are identical to the corresponding parts of the bicycle operating device 10 will be given the same reference symbol.

Here, in the second embodiment, the restricting member 114 is pivotally arranged to move between a non-restricting position (FIG. 44) and a restricting position (FIG. 45).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle operating device. Accordingly, these directional terms, as utilized to describe the bicycle operating device should be interpreted relative to a bicycle in an upright riding position on a horizontal surface and that is equipped with the bicycle operating device. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
   a base member;
   a positioning ratchet movably mounted with respect to the base member, the positioning ratchet being configured to move in a first direction and a second direction that is opposite to the first direction, the first direction corresponding to an inner wire pulling direction and the second direction corresponding to an inner wire releasing direction, the positioning ratchet having a fully pulled position in which the positioning ratchet has moved fully in the first direction to a position corresponding to an end gear;
   a holding member movably mounted with respect to the base member between a holding position and a releasing position to selectively establish a plurality of gear positions of the positioning ratchet, the holding member preventing movement of the positioning ratchet in the second direction while the holding member is in the holding position, the holding member releasing the positioning ratchet for movement in the second direction while the holding member is in the releasing position, the holding member holding the positioning ratchet in one of the gear positions while the holding member is in the holding position; and
   a restricting member movably mounted with respect to the base member between a non-restricting position and at least one restricting position, the restricting member being configured to contact a part fixed to the positioning ratchet so that the restricting member prevents movement of the positioning ratchet in the first direction to the fully pulled position while the restricting member is in the at least one restricting position,
   the positioning ratchet being arranged to move in a first set of the gear positions while the restricting member is positioned in the non-restricting position, and to move in a second set of the gear positions while the restricting member is positioned in the at least one restricting position.

2. The bicycle operating device according to claim 1, wherein
   the holding member selectively establishes at least four gear positions.

3. The bicycle operating device according to claim 1, wherein
   the second set of the gear positions has a fewer total number of the gear positions than a total number of the gear positions of the first set of the gear positions.

4. The bicycle operating device according to claim 1, wherein
   the gear positions include a first gear position and a second gear position, the second gear position being sequentially arranged adjacent and downstream of the first gear position as the positioning ratchet moves in the first direction from the first gear position to the second gear position, the first set of the gear positions including the second gear position, and the second set of the gear positions not including the second gear position.

5. The bicycle operating device according to claim 1, wherein
   the at least one restricting position includes a first restricting position and a second restricting position to establish at least three different sets of the gear positions, the positioning ratchet being arranged to move in the second set of the gear positions while the restricting member is in the first restricting position, and to move in a third set of the gear positions while the restricting member is in the second restricting position.

6. The bicycle operating device according to claim 5, wherein
   the second set of the gear positions has a fewer total number of the gear positions than a total number of the gear positions of the first set of the gear positions, and the third set of the gear positions has a fewer total number of the gear positions than the total number of the gear positions of the second set of the gear positions.

7. The bicycle operating device according to claim 1, wherein
   the restricting member is pivotally mounted with respect to the base member about a mounting axis.

8. The bicycle operating device according to claim 7, wherein
   the restricting member includes a non-restriction surface that does not restrict engagement of the holding member with the positioning ratchet to establish each of the gear positions, and the restricting member includes a restriction surface that restricts movement of the positioning ratchet in the first direction while the restricting member is positioned in the at least one restricting position.

9. The bicycle operating device according to claim 7, wherein
the at least one restricting position includes a first restricting position and a second restricting position to establish at least three different sets of the gear positions,
the restricting member includes a first restriction surface that restricts movement of the positioning ratchet in the first direction while the restricting member is positioned in the first restricting position, and
the restricting member includes a second restriction surface that restricts movement of the positioning ratchet in the first direction while the restricting member is positioned in the second restricting position.

10. The bicycle operating device according to claim 9, wherein
the first restriction surface is located a first linear distance from the mounting axis of the restricting member, and
the second restriction surface is located a second linear distance from the mounting axis of the restricting member, the second linear distance is longer than the first linear distance.

11. The bicycle operating device according to claim 1, wherein
the positioning ratchet is rotatably mounted with respect to the base member about a pivot axis.

12. The bicycle operating device according to claim 11, wherein
the positioning ratchet includes a plurality of positioning abutments circumferentially arranged with respect to the pivot axis, the positioning abutments are selectively engaged with the holding member to selectively establish the gear positions.

13. The bicycle operating device according to claim 11, further comprising
a wire takeup member arranged to rotate together with the positioning ratchet as the positioning ratchet rotates with respect to the base member about the pivot axis.

14. The bicycle operating device according to claim 11, wherein
the holding member includes a first holding pawl pivotally mounted with respect to the base member about a pawl pivot axis between a first holding position and a first releasing position, and
the holding member includes a second holding pawl pivotally mounted with respect to the base member about the pawl pivot axis between a second holding position and a second releasing position.

15. The bicycle operating device according to claim 1, further comprising
a first operating member selectively moving the holding member from the holding position to the releasing position as the first operating member moves from a first rest position to a first actuated position.

16. The bicycle operating device according to claim 15, further comprising
a release member movably mounted with respect to the base member, the release member selectively moving the holding member from the holding position to the releasing position as the release member moves with respect to the base member; and
a release pawl operatively coupled to the first operating member, and arranged to move the release member from the holding position to the releasing position as the first operating member moves from the first rest position to the first actuated position.

17. The bicycle operating device according to claim 15, further comprising
a second operating member operatively coupled to the positioning ratchet to move the positioning ratchet with respect to the base member in the first direction as the second operating member moves from a second rest position to a second actuated position.

18. The bicycle operating device according to claim 17, further comprising
a pulling member movably mounted with respect to the base member, the pulling member moving the positioning ratchet in the first direction as the pulling member moves with respect to the base member; and
a pulling pawl movably mounted on the second operating member, the pulling pawl contacting the pulling member and moving the pulling member as the second operating member moves from the second rest position to the second actuated position.

19. The bicycle operating device according to claim 1, further comprising
a friction member contacting the restricting member to maintain the restricting member in one of the non-restricting position and the at least one restricting position.

20. A bicycle operating device comprising:
a base member;
a positioning ratchet movably mounted with respect to the base member, the positioning ratchet being configured to move a first direction and a second direction that is opposite to the first direction, the first direction corresponding to an inner wire pulling direction and the second direction corresponding to an inner wire releasing direction, the positioning ratchet having a fully pulled position in which the positioning ratchet has moved fully in the first direction to a position corresponding to an end gear;
a holding member movably mounted with respect to the base member between a holding position and a releasing position to selectively establish a plurality of gear positions, the holding member preventing movement of the positioning ratchet in the second direction while the holding member is in the holding position, the holding member releasing the positioning ratchet for movement in the second direction while the holding member is in the releasing position, the holding member holding the positioning ratchet in one of the gear positions while the holding member is in the holding position, the gear positions including a first gear position and a second gear position, the second gear position being sequentially arranged adjacent and downstream of the first gear position as the positioning ratchet moves in the first direction from the first gear position to the second gear position; and
a restricting member movably mounted with respect to the base member between a non-restricting position and at least one restricting position, the restricting member being configured to contact a part fixed to the positioning ratchet so that the restricting member prevents movement of the positioning ratchet in the first direction to the fully pulled position while the restricting member is in the at least one restricting position,
the positioning ratchet being arranged to move in a first set of the gear positions including the first gear position while the restricting member is positioned in the non-restricting position, and to move in a second set of the gear positions not including the first gear position while the restricting member is positioned in the at least one restricting position.

21. A bicycle operating device comprising:
a base member;
a positioning ratchet movably mounted with respect to the base member, the positioning ratchet being configured to move a first direction and a second direction that is opposite to the first direction;
a holding member movably mounted with respect to the base member between a holding position and a releasing position to selectively establish a plurality of gear positions, the holding member preventing movement of the positioning ratchet in the second direction while the holding member is in the holding position, the holding member releasing the positioning ratchet for movement in the second direction while the holding member is in the releasing position, the holding member holding the positioning ratchet in one of the gear positions while the holding member is in the holding position; and
a restricting member movably mounted with respect to the base member between a non-restricting position and at least two restricting positions to establish at least three different sets of the gear positions, the restricting member being configured to contact a part fixed to the positioning ratchet in each of the two restricting positions,
the positioning ratchet being arranged to move in a first set of the at least three different sets of the gear positions while the restricting member is positioned in the non-restricting position, and to move in at least two additional sets of the at least three different sets of the gear positions while the restricting member is positioned in the at least two restricting positions, respectively.

22. A bicycle operating device comprising:
a base member;
a positioning ratchet movably mounted with respect to the base member about a pivot axis, the positioning ratchet being configured to move a first direction and a second direction that is opposite to the first direction, the first direction corresponding to an inner wire pulling direction and the second direction corresponding to an inner wire releasing direction, the positioning ratchet having a fully pulled position in which the positioning ratchet has moved fully in the first direction to a position corresponding to an end gear;
a holding member movably mounted with respect to the base member between a holding position and a releasing position to selectively establish at least four gear positions, the holding member preventing movement of the positioning ratchet in the second direction while the holding member is in the holding position, the holding member releasing the positioning ratchet for movement in the second direction while the holding member is in the releasing position, the holding member holding the positioning ratchet in one of the gear positions while the holding member is in the holding position; and
a restricting member movably mounted with respect to the base member between a non-restricting position and at least one restricting position, the restricting member being configured to contact a part fixed to the positioning ratchet so that the restricting member prevents movement of the positioning ratchet in the first direction to the fully pulled position while the restricting member is in the at least one restricting position,
the positioning ratchet being arranged to move in a first set of the gear positions while the restricting member is positioned in the non-restricting position, and to move in a second set of the gear positions while the restricting member is positioned in the at least one restricting position.

* * * * *